United States Patent
Deguchi et al.

(10) Patent No.: US 10,625,804 B2
(45) Date of Patent: Apr. 21, 2020

(54) VEHICLE WITH LINKAGE MECHANISM

(71) Applicant: YAMAHA HATSUDOKI KABUSHIKI KAISHA, Iwata-shi, Shizuoka (JP)

(72) Inventors: Motoaki Deguchi, Iwata (JP); Masashi Matsuo, Iwata (JP); Eisuke Furuse, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

(21) Appl. No.: 16/206,669

(22) Filed: Nov. 30, 2018

(65) Prior Publication Data
US 2019/0100268 A1 Apr. 4, 2019

Related U.S. Application Data

(63) Continuation-in-part of application No. PCT/JP2017/019702, filed on May 26, 2017.

(30) Foreign Application Priority Data
May 30, 2016 (JP) ................................. 2016-107640

(51) Int. Cl.
*B62J 27/00* (2020.01)
*B62K 5/05* (2013.01)
(Continued)

(52) U.S. Cl.
CPC .............. *B62J 27/00* (2013.01); *B60R 21/16* (2013.01); *B60R 21/23* (2013.01); *B62K 5/027* (2013.01);
(Continued)

(58) Field of Classification Search
CPC .......... B62J 27/00; B60R 21/16; B60R 21/23; B62K 5/027; B62K 5/05
See application file for complete search history.

(56) References Cited

U.S. PATENT DOCUMENTS

| D547,242 S | 7/2007 | Lambri | |
|---|---|---|---|
| 8,342,548 B1 * | 1/2013 | Vey | B60G 3/20 180/312 |

(Continued)

FOREIGN PATENT DOCUMENTS

| CN | 104487322 A | 4/2015 |
|---|---|---|
| CN | 104487332 A | 4/2015 |

(Continued)

OTHER PUBLICATIONS

Piaggio, "Catalogo parti di ricambio", NTRC000U01, MP3 300 ie LT Mod. ZAPM64102, 116 pages.

*Primary Examiner* — Brian L Swenson
(74) *Attorney, Agent, or Firm* — Rabin & Berdo, P.C.

(57) ABSTRACT

A vehicle includes left and right front wheels, a left shock absorber, a right shock absorber, a linkage mechanism including a right side member, a left side member, a plurality of cross members, and an air bag housing case having a bottom surface and side surfaces, and housing an undeployed air bag in a housing space defined by the bottom surface and the side surfaces. The air bag housing case is located behind the linkage mechanism in a front-rear direction and below an upper end of a handlebar in a top-bottom direction, and at least partially located above a lower end of a movable region of the right side member, the left side member, and the cross members of the linkage mechanism. The bottom surface is disposed along a surface including a rear portion of the movable region when seen from a side of the vehicle.

6 Claims, 12 Drawing Sheets

(51) Int. Cl.
  *B62K 5/08* (2006.01)
  *B62K 5/10* (2013.01)
  *B60R 21/16* (2006.01)
  *B60R 21/23* (2006.01)
  *B62K 5/027* (2013.01)

(52) U.S. Cl.
  CPC .................. *B62K 5/05* (2013.01); *B62K 5/08* (2013.01); *B62K 5/10* (2013.01)

(56) References Cited

U.S. PATENT DOCUMENTS

| | | | |
|---|---|---|---|
| 2004/0256848 | A1 | 12/2004 | Miyata et al. |
| 2015/0344097 | A1 | 12/2015 | Iizuka et al. |
| 2016/0137253 | A1 | 5/2016 | Hirayama |
| 2016/0311492 | A1* | 10/2016 | Davis ................... B62K 5/10 |
| 2017/0088221 | A1* | 3/2017 | Ohno ................... B60G 13/005 |
| 2017/0129562 | A1 | 5/2017 | Hirakawa et al. |
| 2017/0144719 | A1* | 5/2017 | Terada ................... B62K 3/002 |
| 2018/0257730 | A1* | 9/2018 | Mitsuoka ............... B62K 5/027 |
| 2019/0118598 | A1* | 4/2019 | Sasaki ..................... B62J 15/00 |
| 2019/0118894 | A1* | 4/2019 | Hirakawa ................ B62K 5/10 |

FOREIGN PATENT DOCUMENTS

| | | |
|---|---|---|
| IT | MI2009A002076 A1 | 5/2011 |
| JP | 2003-011871 A | 1/2003 |
| JP | 2005-8055 A | 1/2005 |
| JP | 2006-248289 A | 9/2006 |
| JP | 2007310510 A | 11/2007 |
| JP | 4451032 B2 | 4/2010 |
| JP | 2010-228551 A | 10/2010 |
| JP | 2012-250624 A | 12/2012 |
| JP | 2015-145152 A | 8/2015 |
| WO | WO-2014/054697 A1 | 4/2014 |
| WO | WO-2014/098227 A1 | 6/2014 |
| WO | WO-2015/002166 A1 | 1/2015 |
| WO | WO-2016/052430 A1 | 4/2016 |

* cited by examiner

VEHICLE WITH LINKAGE MECHANISM

CROSS-REFERENCES TO RELATED APPLICATIONS

The present application is a continuation-in-part application of International Application No. PCT/JP2017/019702, filed on May 26, 2017, and having the benefit of the earlier filing date of Japanese Application No. 2016-107640, filed May 30, 2016. The content of each of the identified applications is incorporated herein by reference in its entirety.

BACKGROUND

Technical Field

The present teaching relates to a vehicle including a linkage mechanism and an air bag.

Background Art

A conventionally known vehicle includes a body frame, a linkage mechanism disposed in a front portion, and two front wheels, and leans in a vehicle width direction. As such a vehicle, Non-Patent Document 1 (identified further on), for example, discloses a configuration in which the two front wheels are connected to the linkage mechanism and the linkage mechanism is supported by a linkage support part constituting a part of the body frame and disposed in a front portion of the vehicle.

Non-Patent Document 1 discloses that the linkage mechanism includes two pairs of cross members disposed ahead of and behind the linkage support part in a front-rear direction of the vehicle and opposed to each other in the front-rear direction. In this configuration, while a rider is boarded on the vehicle, a part of the linkage mechanism is located between the rider and the linkage support part.

In the vehicle including the linkage mechanism described above, to avoid interference between the linkage mechanism and the rider, the linkage support part is located at a forward position, as compared to a head pipe disposed in a vehicle not including the linkage mechanism described above, for example.

Patent Document 1 (identified further on) discloses a configuration of a vehicle including a linkage mechanism as described above, where an air bag is disposed above the linkage mechanism. Specifically, in the configuration disclosed in Patent Document 1, the air bag is disposed above a cross member disposed ahead of a linkage support part. That is, in the configuration disclosed in Patent Document 1, the air bag is disposed ahead of a handlebar in order to avoid interference with the linkage mechanism.

CITATION LIST

Patent Document

Patent Document 1: ITMI2009A002076

Non-Patent Document

Non-Patent Document 1: Catalogo parti di ricambio, MP3 300 ie LT Mod. ZAPM64102, Piaggio & C. S.p.A.

A linkage mechanism as disclosed in Patent Document 1 and Non-Patent Document 1 supports a right front wheel and a left front wheel so that the right front wheel and the left front wheel can be displaced in a top direction of a body frame or in a bottom direction of a body frame.

Specifically, the linkage mechanism includes a left side member and a right side member extending in the top-bottom direction of the body frame, and a plurality of cross members having left end portions supporting the left side member, right end portions supporting the right side member, and intermediate portions rotatably supported on a linkage support part of the body frame.

The left end portions of the cross members support the left side member so that the left side member can rotate about a left axis extending in a front-rear direction of the body frame, and the right end portions of the cross members support the right side member so that the right side member can rotate about a right axis parallel to the left axis.

Accordingly, when the body frame leans leftward or rightward relative to a vertical direction, members constituting the linkage mechanism greatly move. That is, in the vehicle configuration as described above, a movable region of the linkage mechanism, that is, a region where members of the linkage mechanism can move, is relatively large.

In a case where an air bag is deployed toward a rider at a collision of the vehicle, for example, the air bag is preferably deployed from a position ahead of the rider and closer to the rider. For this reason, the air bag is preferably disposed around a linkage mechanism located in a front portion of the vehicle.

In the case of disposing the air bag around the linkage mechanism having the movable region described above while avoiding interference with the linkage mechanism, however, the size of the vehicle front portion can be increased depending on the location of the air bag.

SUMMARY

It is therefore an object of the present teaching to obtain a configuration that can suppress an increase in size of a front portion of a vehicle including a linkage mechanism and an air bag.

In a vehicle including an air bag, the air bag is deployed between a rider and a vehicle body. Thus, an air bag housing part housing the air bag in an undeployed state is preferably attached to the vehicle body such that an opening in which the air bag is deployed is located ahead of a rider at a position as close to the front of the rider as possible.

In the vehicle including the linkage mechanism, a part of the linkage mechanism is located between the rider and a linkage support part supporting the linkage mechanism in a vehicle front portion. This linkage mechanism, which has a relatively large movable region of components, greatly moves when the vehicle body leans leftward or rightward. Thus, in the case of disposing the air bag housing part at the preferable position described above while avoiding the movable region of the linkage mechanism, the size of the vehicle front portion can increase.

On the other hand, in a vehicle not including a linkage mechanism, many of parts disposed in the vehicle front portion are fixed parts, and thus, it is unnecessary to obtain a movable region of movable parts, unlike the vehicle including the linkage mechanism described above. Thus, in the vehicle not including a linkage mechanism, the size of the vehicle front portion does not increase, unlike the vehicle including the linkage mechanism. That is, in the vehicle not including a linkage mechanism, it is inherently unnecessary to study how to dispose an air bag near movable parts.

Through investigations of the function and layout of an air bag in a vehicle including a linkage mechanism, inventors of the present teaching found that a trajectory drawn in accordance with movement of components of the linkage mechanism forms a surface having a predetermined shape behind a movable region of the linkage mechanism (where this surface will be hereinafter referred to as a rear surface of the movable region). The inventors also found that the rear surface of the movable region of the linkage mechanism also extends in the top-bottom direction of the vehicle.

On the other hand, to avoid interference between the rider seated on the vehicle and the linkage mechanism, the linkage support part supporting the linkage mechanism is disposed at a forward position, as compared to a head pipe disposed in a vehicle not including the linkage mechanism, for example. Thus, the vehicle including the linkage mechanism has relatively large space ahead of the rider and between the rider and the vehicle body.

The inventors have intensively studied a configuration that can suppress an increase in size of a vehicle front portion while effectively utilizing the space described above. Consequently, in view of the foregoing points comprehensively, the inventors arrived at the configuration as follows.

A vehicle according to an aspect of the present teaching is a vehicle including an air bag. The vehicle includes: a handlebar connected to a steering shaft; a body frame supporting the steering shaft so that the steering shaft is rotatable; a left front wheel and a right front wheel respectively disposed at a left and a right of the vehicle when seen from a front of the vehicle, the left front wheel and the right front wheel being steerable; a left shock absorber that supports the left front wheel on a lower portion of the left shock absorber and buffers an impact on the left front wheel in a top-bottom direction of the body frame; a right shock absorber that supports the right front wheel on a lower portion of the right shock absorber and buffers an impact on the right front wheel in the top-bottom direction of the body frame; a linkage mechanism including a right side member that supports an upper portion of the right shock absorber so that the upper portion of the right shock absorber is rotatable about a right steering axis extending in the top-bottom direction of the body frame, a left side member that supports an upper portion of the left shock absorber so that the upper portion of the left shock absorber is rotatable about a left steering axis parallel to the right steering axis, and a plurality of cross members having right end portions that support the right side member so that the right side member is rotatable about a right axis extending in a front-rear direction of the body frame, left end portions that support the left side member so that the left side member is rotatable about a left axis parallel to the right axis, and intermediate portions supported on the body frame so that the intermediate portions are rotatable about an intermediate axis parallel to the right axis and the left axis; and an air bag housing part having a bottom surface, side surfaces, and a housing space having an opening, the housing space being defined by the bottom surface and the side surfaces and being surrounded by the side surfaces, the housing space housing the air bag in an undeployed state. The air bag housing part is located behind the linkage mechanism in the front-rear direction and below an upper end of the handlebar in the top-bottom direction, at least a part of the air bag housing part is located above a lower end of a movable region of the right side member, the left side member, and the plurality of cross members of the linkage mechanism, and the bottom surface of the air bag housing part is disposed along a surface including a rear portion of the movable region when seen from a side of the vehicle.

With the configuration described above, it is possible to dispose the air bag housing part close to the linkage mechanism while avoiding the movable region of the linkage mechanism. Accordingly, projection of the air bag housing case toward a rider can be prevented, and an increase in size of a front portion of the vehicle can also be prevented.

The body frame may include a linkage support part supporting the linkage mechanism. At least a part of the air bag housing part may be disposed below an upper end of the linkage support part in the top-bottom direction.

Accordingly, the air bag housing part can be disposed closer to the rider. Consequently, the air bag can be deployed at a position closer to the rider.

At least a part of the air bag housing part may be disposed below an upper end of the movable region in the top-bottom direction.

Accordingly, the air bag housing part can be disposed much closer to the rider. As a result, the air bag can be deployed at a position much closer to the rider.

The opening of the air bag housing part may be disposed below the handlebar in the top-bottom direction.

Accordingly, the air bag housing part can be disposed in the vehicle front portion. Thus, the air bag can be deployed toward the rider from front of the vehicle.

The air bag housing part may be disposed at the right of a left end of the cross members and at the left of a right end of the cross members in a left-right direction.

Accordingly, in the vehicle, the air bag housing case can be disposed close to the center in the vehicle width direction. Thus, the air bag can be deployed between the rider and the vehicle body.

The air bag housing part may overlap a center portion of the cross members in a left-right direction when seen from front of the vehicle.

Accordingly, in the vehicle, the air bag housing case can be disposed closer to the center in the vehicle width direction. As a result, the air bag can be more securely deployed between the rider and the vehicle body.

Advantages of Invention

In the vehicle according to an embodiment of the present teaching, in the configuration including a linkage mechanism in a vehicle front portion, an increase in size of the vehicle front portion can be suppressed even with an air bag present.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Embodiments of a vehicle according to the present teaching are discussed herein.

In the following description, for purposes of explanation, numerous specific details are set forth in order to provide a thorough understanding of the present teaching. It will be evident, however, to one skilled in the art that the present teaching may be practiced without these specific details.

The present disclosure is to be considered as an exemplification of the invention, and is not intended to limit the invention to the specific embodiments illustrated by the figures or description below.

A target to which the present teaching is applied is not limited to a tricycle. The present teaching may be applicable to vehicles except tricycles as long as these vehicles include linkage mechanisms and air bags.

DETAILED DESCRIPTION

Figure 1:
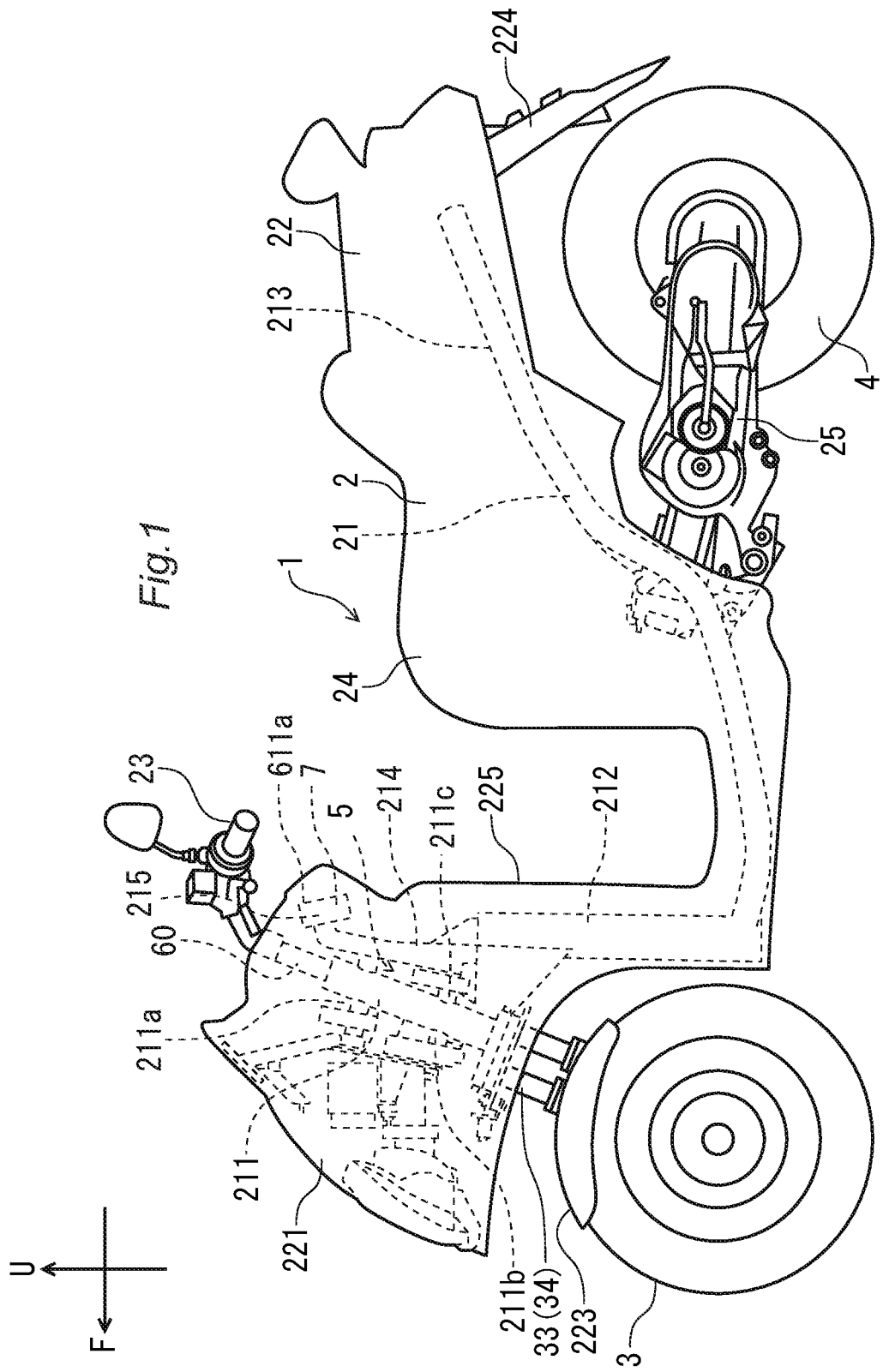
FIG. 1 is a side view illustrating a schematic overall configuration of a vehicle according to a first embodiment.

Embodiments of the present teaching will be described hereinafter with reference to the drawings. In the drawings, the same parts are denoted by the same reference numerals, and description thereof will not be repeated. In the following description, dimensions of components in each drawing do not strictly represent dimensions, dimensional ratios, and the like of actual components.

In the following description, arrow F in the drawings represents the forward direction of a vehicle. Arrow U in the drawings represents the upward direction of the vehicle. Arrow R in the drawings represents the rightward direction of the vehicle. Directions of front, rear, left, and right respectively refer to directions of front, rear, left, and right as would be perceived by a rider driving the vehicle.

First Embodiment (Overall Configuration)

FIG. 1 is a side view illustrating a schematic overall configuration of a vehicle 1 according to a first embodiment. The vehicle 1 includes a vehicle body 2, a pair of left and right front wheels 3, and a rear wheel 4. That is, the vehicle 1 in this embodiment is a tricycle having the pair of left and right front wheels 3.

The vehicle body 2 includes a linkage mechanism 5, an air bag device 7, a body frame 21, a vehicle body cover 22, a handlebar 23, a seat 24, a power unit 25, a left shock absorber 33, and a right shock absorber 34.

(Body Frame)

The body frame 21 supports the power unit 25 and the seat 24, for example. The power unit 25 includes a power source such as an engine or an electric motor and a transmission mechanism such as a transmission device. In FIG. 1, the body frame 21 is indicated by broken lines.

The body frame 21 includes a head pipe 211 extending in a top-bottom direction, a front frame 212 extending from the head pipe 211 rearward in the vehicle, and a rear frame 213 extending from a vehicle rear end of the front frame 212 rearward in the vehicle. The head pipe 211 is disposed in a front portion of the vehicle 1. The linkage mechanism 5 is disposed around the head pipe 211.

The head pipe 211 is supported on the front frame 212. A steering shaft 60 is rotatably inserted in the head pipe 211. The steering shaft 60 extends in the top-bottom direction. A first penetration part 211a (linkage support part) projects from the head pipe 211 to penetrate the linkage mechanism 5 in the vehicle forward direction. A second penetration part 211b (linkage support part) projects from the head pipe 211 to penetrate the linkage mechanism 5 in the vehicle forward direction. A third penetration part 211c (linkage support part) projects from the head pipe 211 to penetrate the linkage mechanism 5 in the vehicle rearward direction.

The handlebar 23 extending in a left-right direction is attached to the upper end of the steering shaft 60. The front frame 212 extends from the front end connected to the head pipe 211 rearward and downward in the vehicle. The rear frame 213 supports the seat 24 and a tail lamp (not shown).

A support frame 214 extending in the top-bottom direction is connected to an upper portion of the front frame 212. The support frame 214 is disposed behind the head pipe 211 in the front-rear direction. The support frame 214 is also connected to the head pipe 211.

An air bag housing case 215 (air bag housing part) housing the air bag device 7 is connected to an upper portion of the support frame 214. A configuration of the air bag housing case 215 will be described later.

(Vehicle Body Cover)

The body frame 21 is covered with the vehicle body cover 22 that is a vehicle appearance member. The vehicle body cover 22 includes a front cover 221, a pair of front fenders 223, a rear fender 224, and a leg shield 225.

The front cover 221 is disposed ahead of the seat 24 in the front-rear direction. The front cover 221 covers at least a part of the head pipe 211 or the linkage mechanism 5.

The front fenders 223 are disposed above the pair of left and right front wheels 3 in the top-bottom direction. The front fenders 223 are disposed below the front cover 221 in the top-bottom direction. The rear fender 224 is disposed above the rear wheel 4 in the top-bottom direction.

The leg shield 225 is disposed behind the head pipe 211 in the front-rear direction. The leg shield 225 extends in the top-bottom direction. The leg shield 225 is disposed ahead of the legs of a user riding on the vehicle 1 in the front-rear direction.

The pair of left and right front wheels 3 is disposed below the head pipe 211 and the linkage mechanism 5 in the top-bottom direction. The pair of left and right front wheels 3 is disposed below the front cover 221 in the top-bottom direction.

Figure 2:
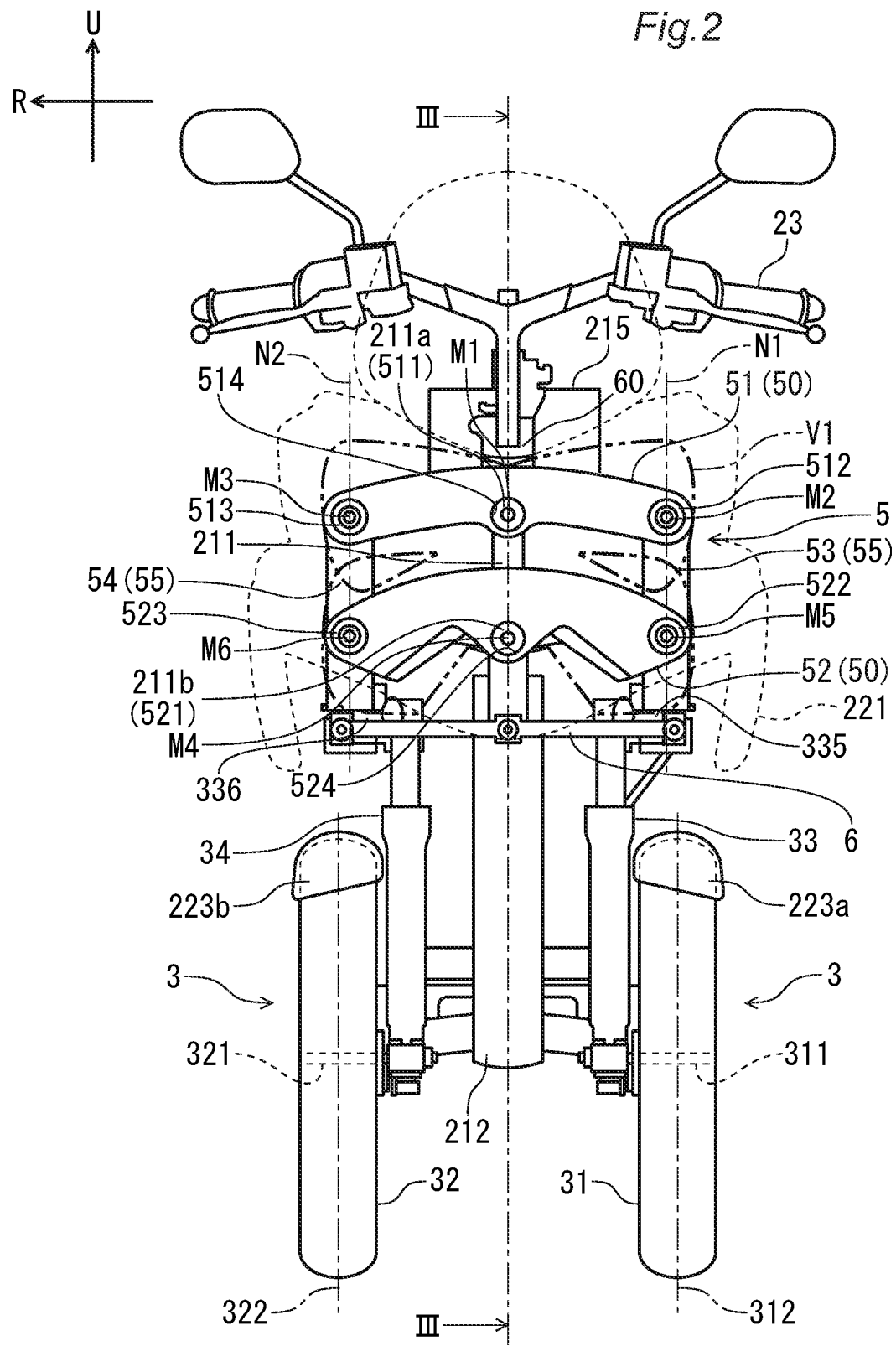
FIG. 2 is a front view illustrating a configuration of a vehicle front portion when the vehicle is seen with a vehicle body cover detached.

FIG. 2 is a front view illustrating a state where the vehicle body cover 22 is detached in the vehicle 1. As described above, the vehicle 1 includes the handlebar 23, the steering shaft 60, the head pipe 211, the pair of left and right front wheels 3, and the linkage mechanism 5. In the following description, in the pair of left and right front wheels 3, the left front wheel will be referred to as a left front wheel 31, and the right front wheel will be referred to as a right front wheel 32.

Figure 3:
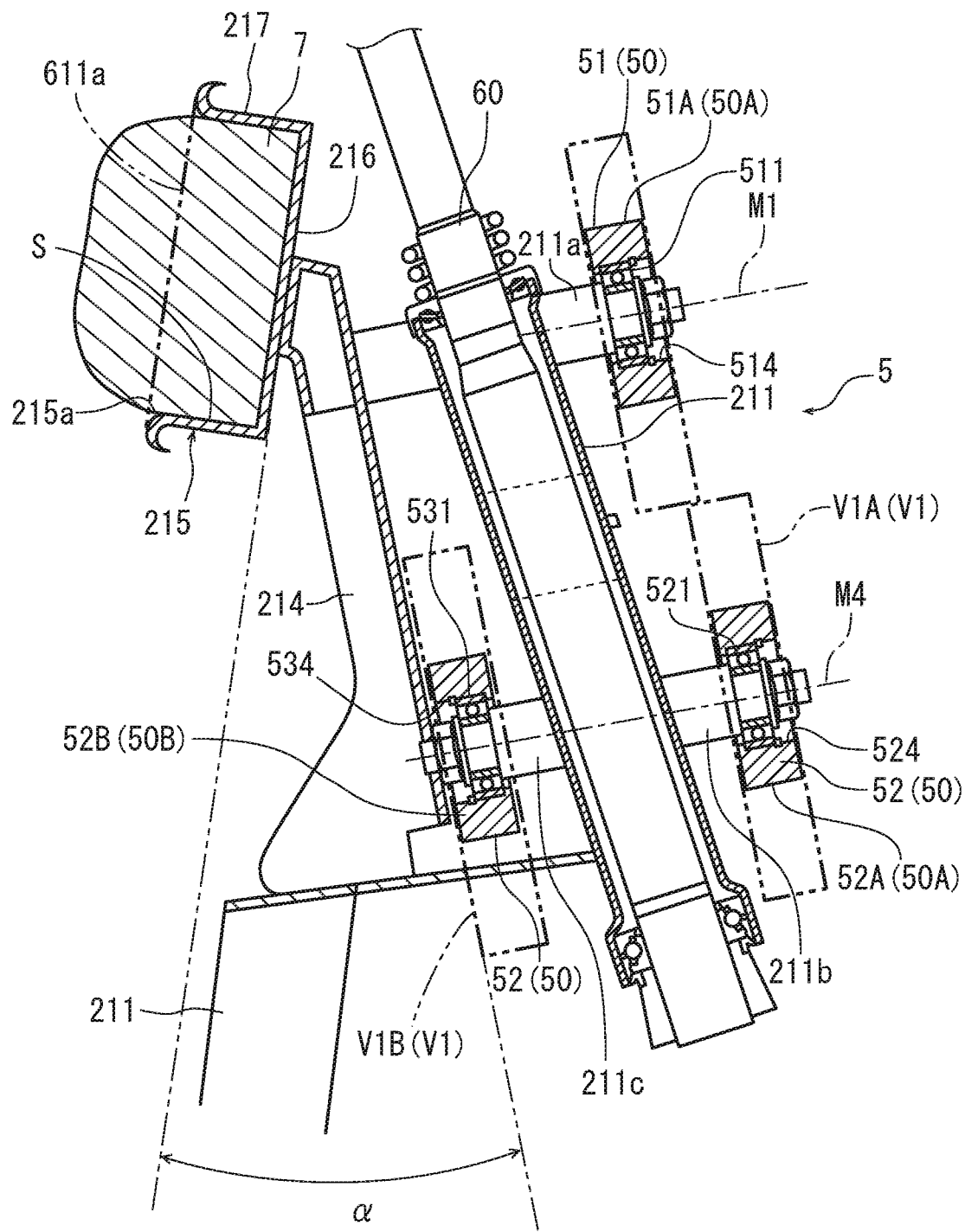
FIG. 3 is a cross-sectional view taken along line III-III in FIG. 2.

The linkage mechanism 5 is connected to the left front wheel 31 and the right front wheel 32. The linkage mechanism 5 is rotatably attached to the head pipe 211. The linkage mechanism 5 includes a plurality of cross members 50 (see FIGS. 2 and 3) and a plurality of side members 55 (see FIG. 2). FIG. 3 is a cross-sectional view taken along line III-III in FIG. 2. In FIG. 3, the rotational shaft such as the steering shaft 60 and nuts are not shown in the cross section.

As illustrated in FIGS. 2 and 3, the plurality of cross members 50 include an upper cross member 51 and a plurality of lower cross members 52. As illustrated in FIG. 3, the upper cross member 51 includes a front upper cross member 51A disposed ahead of and at a side of head pipe 211 in the front-rear direction. The front upper cross member 51A is a flat plate-shaped member. The plurality of lower cross members 52 include a front lower cross member 52A disposed ahead of the head pipe 211 in the front-rear direction and a rear lower cross member 52B disposed behind the head pipe 211 in the front-rear direction. The front lower cross member 52A and the rear lower cross member 52B are flat plate-shaped members, respectively.

In other words, the plurality of cross members 50 include: a front cross member 50A disposed ahead of the head pipe 211 in the front-rear direction and including the front upper cross member 51A and the front lower cross member 52A; and a rear cross member 50B disposed behind the head pipe 211 in the front-rear direction and including the rear lower cross member 52B.

As illustrated in FIG. 2, the plurality of side members 55 include the left side member 53 and the right side member 54.

(Front Wheel)

As illustrated in FIG. 2, the front wheels 3 include the steerable left front wheel 31 and the steerable right front wheel 32. The left front wheel 31 is disposed at the left of the center of the vehicle 1 in the left-right direction. A first front fender 223a is disposed above the left front wheel 31 in the top-bottom direction. The right front wheel 32 is disposed at the right of the center of the vehicle 1 in the left-right direction. A second front fender 223b is disposed above the right front wheel 32 in the top-bottom direction. The right front wheel 32 and the left front wheel 31 are symmetrically disposed with respect to the center of the vehicle 1 in the left-right direction.

As illustrated in FIG. 2, the left front wheel 31 is connected to the left shock absorber 33. Specifically, the left front wheel 31 is connected to a lower portion of the left shock absorber 33. The left front wheel 31 is supported on the left shock absorber 33 to be rotatable about an axle 311. The axle 311 is disposed in a lower portion of the left shock absorber 33 to extend in the left-right direction of the body frame 21. The left front wheel 31 is rotatable about a rotation axis 312.

The right front wheel 32 is connected to the right shock absorber 34. Specifically, the right front wheel 32 is connected to a lower portion of the right shock absorber 34. The right front wheel 32 is supported on the right shock absorber 34 to be rotatable about an axle 321. The axle 321 is disposed in a lower portion of the right shock absorber 34 to extend left-right direction of the body frame 21. The right front wheel 32 is rotatable about a rotation axis 322.

As described above, the left front wheel 31 rotates about the rotation axis 312 and the right front wheel 32 rotates about the rotation axis 322 so that the vehicle 1 can change a traveling direction.

(Shock Absorber)

The left shock absorber 33 absorbs an impact applied to the left front wheel 31. As illustrated in FIG. 2, the left shock absorber 33 is disposed below the linkage mechanism 5 in the top-bottom direction of the body frame 21. The left shock absorber 33 is disposed between the left side member 53 and the left front wheel 31. The left shock absorber 33 is disposed to extend in the top-bottom direction of the body frame 21 along a left steering axis N1 extending in parallel with the steering shaft 60 and the head pipe 211. The left shock absorber 33 is disposed at the left of the head pipe 211 in the left-right direction of the body frame 21. The left shock absorber 33 is disposed at the right of the left front wheel 31 in the left-right direction of the body frame 21.

The right shock absorber 34 absorbs an impact applied to the right front wheel 32. The right shock absorber 34 is disposed below the linkage mechanism 5 in the top-bottom direction of the body frame 21. The right shock absorber 34 is disposed between the right side member 54 and the right front wheel 32. The right shock absorber 34 is disposed to extend in the top-bottom direction of the body frame 21 along a right steering axis N2 extending in parallel with the steering shaft 60 and the head pipe 211. The right shock absorber 34 is disposed at the right of the head pipe 211 in the left-right direction of the body frame 21. The right shock absorber 34 is disposed at the left of the right front wheel 32 in the left-right direction of the body frame 21.

The left side member 53 is disposed at the left of the head pipe 211 in the left-right direction of the body frame 21. The right side member 54 is disposed at the right of the head pipe 211 in the left-right direction of the body frame 21. In this embodiment, the left side member 53 and the right side member 54 are cylindrical columnar members, respectively. The left side member 53 and the right side member 54 may be other columnar members or tubular members.

The left side member 53 and the right side member 54 extend in the top-bottom direction of the body frame 21 while the vehicle 1 is in an upright position.

In the top-bottom direction, a left bracket 335 to which the left shock absorber 33 is connected is disposed below the left side member 53. A lower portion of the left side member 53 supports the left shock absorber 33 so that the left shock absorber 33 can rotate about the left steering axis N1.

In the top-bottom direction, a right bracket 336 to which the right shock absorber 34 is connected is disposed below the right side member 54. A lower portion of the right side member 54 supports the right shock absorber 34 so that the right shock absorber 34 can rotate about the right steering axis N2.

The upper cross member 51 is a member extending in the left-right direction of the body frame 21 when seen from the front of the vehicle 1. The upper cross member 51 is disposed ahead of the head pipe 211 in the front-rear direction. In the left-right direction of the body frame 21, a first through hole 514 is disposed at the center in the left-right direction of the upper cross member 51. An upper left bearing 512 is disposed at the left end of the upper cross member 51. An upper right bearing 513 is disposed at the right end of the upper cross member 51. The first penetration part 211a extending from the head pipe 211 penetrates the first through hole 514.

As illustrated in FIG. 3, the upper cross member 51 is provided with an upper intermediate bearing 511 between the first penetration part 211a and the first through hole 514. Thus, the first penetration part 211a and the upper intermediate bearing 511 support the upper cross member 51 so that the upper cross member 51 is rotatable with respect to the head pipe 211. The upper cross member 51 rotates with respect to the head pipe 211 about an upper intermediate axis (intermediate axis) M1 that is a rotation center of the upper intermediate bearing 511. That is, the upper intermediate axis M1 is located inward of the first through hole 514. The upper intermediate axis M1 is tilted relative to the horizontal direction such that the upper intermediate axis M1 ascends toward the front of the vehicle.

Figure 4:
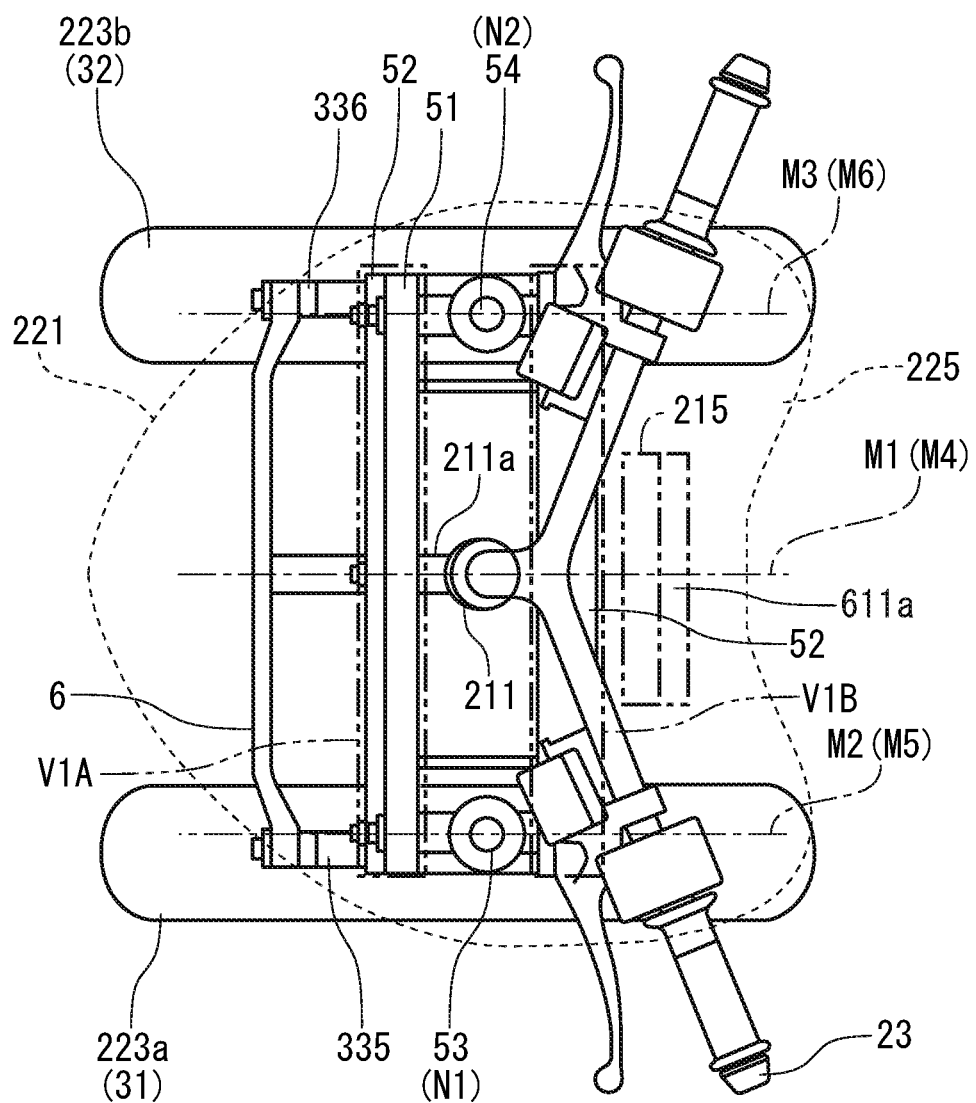
FIG. 4 is a view seen in a direction represented by arrow IX in FIG. 3.

As illustrated in FIG. 2, the upper cross member 51 is connected to an upper portion of the left side member 53 through the upper left bearing 512, and is connected to an upper portion of the right side member 54 through the upper right bearing 513. Accordingly, the upper cross member 51 is rotatable with respect to the left side member 53 and the right side member 54. FIG. 4 is a view seen in direction IX in FIG. 3. As illustrated in FIG. 4, the upper intermediate axis M1 as the rotation center of the upper intermediate bearing 511, an upper left axis (left axis) M2 as the rotation center of the upper left bearing 512, and an upper right axis (right axis) M3 as the rotation center of the upper right bearing 513 are parallel to each other.

(Lower Cross Member)

As illustrated in FIGS. 2 and 3, the plurality of lower cross members 52 are disposed below the upper cross member 51 in the top-bottom direction. The plurality of lower cross members 52 extend in the left-right direction when seen from the front of the vehicle. The length of the plurality of lower cross members 52 in the left-right direction is approximately equal to the length of the upper cross member 51 in the left-right direction. As illustrated in FIG. 3, the plurality of lower cross members 52 include a front lower cross member 52A disposed ahead of the head pipe 211 in the front-rear direction and a rear lower cross member 52B disposed behind the head pipe 211 in the front-rear direction.

A second through hole 524 is disposed at the center of the front lower cross member 52A in the left-right direction. A lower left bearing 522 is disposed at the left of the second through hole 524 of the front lower cross member 52A. A lower right bearing 523 is disposed at the right of the second through hole 524 of the front lower cross member 52A. The second penetration part 211b penetrates the second through hole 524.

As illustrated in FIG. 3, a lower intermediate bearing 521 is disposed between the second penetration part 211b and the second through hole 524. The second penetration part 211b and the lower intermediate bearing 521 support the front lower cross member 52A so that the front lower cross member 52A is rotatable with respect to the head pipe 211. The front lower cross member 52A rotates with respect to the head pipe 211 about a lower intermediate axis M4 that is the rotation center of the lower intermediate bearing 521. That is, the lower intermediate axis M4 is located inward of the second through hole 524.

The rear lower cross member 52B has a configuration similar to that of the front lower cross member 52A. That is, a third through hole 534 is disposed at the center of the rear lower cross member 52B in the left-right direction. The third penetration part 211c penetrates the third through hole 534. A lower intermediate bearing 531 is disposed between the third penetration part 211c and the third through hole 534. The third penetration part 211c and the lower intermediate bearing 531 support the rear lower cross member 52B so that the rear lower cross member 52B is rotatable with respect to the head pipe 211. The rear lower cross member 52B rotates with respect to the head pipe 211 about the lower intermediate axis M4 that is the rotation center of the lower intermediate bearing 531. That is, the lower intermediate axis M4 is located inward of the third through hole 534.

Although not specifically shown, the rear lower cross member 52B is also provided with a lower left bearing and a lower right bearing, in a manner similar to the front lower cross member 52A. The lower left bearing and the lower right bearing are provided in the rear lower cross member 52B at the same positions as the lower left bearing 522 and the lower right bearing 523 provided in the front lower cross member 52A, when seen in the axial direction of the lower intermediate axis M4.

As illustrated in FIG. 4, a lower intermediate axis (intermediate axis) M4 that is the rotation center of the lower intermediate bearings 521 and 531, a lower left axis (left axis) M5 that is the rotation center of the lower left bearing 522, and a lower right axis (right axis) M6 that is the rotation center of the lower right bearing 523 are parallel to each other. The lower intermediate axis M4 is parallel to the upper intermediate axis M1.

As illustrated in FIG. 2, the position of the lower left bearing 522 in the left-right direction of the body frame 21 is the same as the position of the upper left bearing 512 in the left-right direction of the body frame 21 while the vehicle 1 is in the upright position. The position of the lower right bearing 523 in the left-right direction of the body frame 21 is the same as the position of the upper right bearing 513 in the left-right direction of the body frame 21 while the vehicle 1 is in the upright position.

The lower cross members 52 are connected to a lower portion of the left side member 53 through the lower left bearing 522. The lower cross members 52 are connected to a lower portion of the right side member 54 through the lower right bearing 523. Accordingly, the lower cross members 52 are rotatable with respect to the left side member 53 and the right side member 54.

A movable region V1 that is a region where the linkage mechanism 5 operates includes movable regions of the upper cross member 51, the plurality of lower cross members 52, the left side member 53, and the right side member 54. The lower end of the movable region V1 is the lowest position of the linkage mechanism 5 while the linkage mechanism 5 operates, that is, is the lower end of the movable region of the lower cross members 52 in this embodiment. The upper end of the movable region V1 is the uppermost position of the linkage mechanism 5 while the linkage mechanism 5 operates, that is, the upper end of the movable region of the upper cross member 51 in this embodiment.

As illustrated in FIG. 3, the front end of the range of the movable region V1 in the front-rear direction is restricted by the movable regions of the front upper cross member 51A and the front lower cross member 52A, and the rear end of the range of the movable region V1 in the front-rear direction is restricted by the movable region of the rear lower cross member 52B. That is, the forward surface (front surface) of the movable region V1 is restricted by the front surfaces of the front upper cross member 51A and the front lower cross member 52A. The rearward surface (rear surface) of the movable region V1 is restricted by the rear surface of the rear lower cross member 52B. The range of the movable region V1 when seen from the front of the vehicle has an M shape in which a lower center portion is recessed when seen from the front of the vehicle, as indicated by heavy dot-dot-dash lines in FIG. 2.

The linkage mechanism 5 is attached to the head pipe 211. Thus, even when the steering shaft 60 rotates with steering of the handlebar 23, the linkage mechanism 5 does not rotate with respect to the body frame 21.

(Tie Rod)

Next, a tie rod 6 will be described with reference to FIG. 2. The tie rod 6 rotates together with the steering shaft 60, and transfers rotation of the steering shaft 60 to the left front wheel 31 and the right front wheel 32. Accordingly, the left front wheel 31 and the right front wheel 32 can be steered with the handlebar 23. The tie rod 6 is disposed ahead of the head pipe 211 in the front-rear direction. The tie rod 6 extends in the left-right direction of the body frame 21. The tie rod 6 is disposed below the lower cross members 52 and above the left front wheel 31 and the right front wheel 32 in the top-bottom direction. The tie rod 6 is connected to a lower portion of the steering shaft 60. Accordingly, when the steering shaft 60 rotates, the tie rod 6 moves in the left direction or in the right direction.

(Bracket)

As illustrated in FIG. 2, the left bracket 335 is disposed on a lower portion of the left side member 53. The left bracket 335 is connected to the left shock absorber 33.

The left bracket 335 is disposed to be rotatable with respect to the left side member 53 about the left steering axis N1 extending in an extension direction of the left side member 53. The tie rod 6 is connected to the left bracket 335 to be rotatable with respect to the left side member 53 about a rotation axis parallel to the left steering axis N1. That is, the rotation axis about which the left bracket 335 and the left side member 53 rotate relative to each other is parallel to the rotation axis about which the left bracket 335 and the tie rod 6 rotate relative to each other.

The right bracket 336 is disposed on a lower portion of the right side member 54. The right bracket 336 is connected to the right shock absorber 34.

The right bracket 336 is disposed to be rotatable with respect to the right side member 54 about the right steering axis N2 extending in an extension direction of the right side member 54. The tie rod 6 is connected to the right bracket 336 to be rotatable with respect to the right side member 54 about a rotation axis parallel to the right steering axis N2. That is, the rotation axis about which the right bracket 336 and the right side member 54 rotate relative to each other is parallel to the rotation axis about which the right bracket 336 and the tie rod 6 rotate relative to each other.

When the steering shaft 60 rotates with steering of the handlebar 23, the tie rod 6 moves in the left direction or in the right direction. Then, with movement of the tie rod 6, the left bracket 335 rotates with respect to the left side member 53 about the left steering axis N1. With the movement of the tie rod 6, the right bracket 336 rotates with respect to the right side member 54 about the right steering axis N2.

Accordingly, a connecting part of the left bracket 335 to the left shock absorber 33 moves in the left direction or in the right direction, and the left front wheel 31 rotates about the rotation axis 312. A connecting part of the right bracket 336 to the right shock absorber 34 moves in the left direction or in the right direction, and the right front wheel 32 rotates about the rotation axis 322.

In the foregoing manner, the left bracket 335 transfers steering of the handlebar 23 to the left front wheel 31, and the right bracket 336 transfers steering of the handlebar 23 to the right front wheel 32.

(Air Bag Device)

As described above, the vehicle body 2 of the vehicle 1 includes the air bag device 7. As illustrated in FIG. 1, the air bag device 7 is located behind the linkage mechanism 5 in the front-rear direction. The air bag device 7 is located below the upper end of the handlebar 23 and above the lower end of the movable region V1 of the linkage mechanism 5, in the top-bottom direction. When a collision of the vehicle 1 is detected by an unillustrated sensor or the like, the air bag device 7 is deployed from the front to a rider seated on the seat 24.

As illustrated in FIG. 3, the air bag housing case 215 is connected to the support frame 214 connected to an upper portion of the front frame 212. The air bag housing case 215 includes a rectangular bottom surface 216 and four side surfaces 217 extending from the outer periphery of the bottom surface 216 in the thickness direction of the bottom surface. That is, the air bag housing case 215 has a box shape having an opening 215a. The bottom surface 216 and the four side surfaces 217 define housing space S for housing an air bag device 7.

Figure 12:
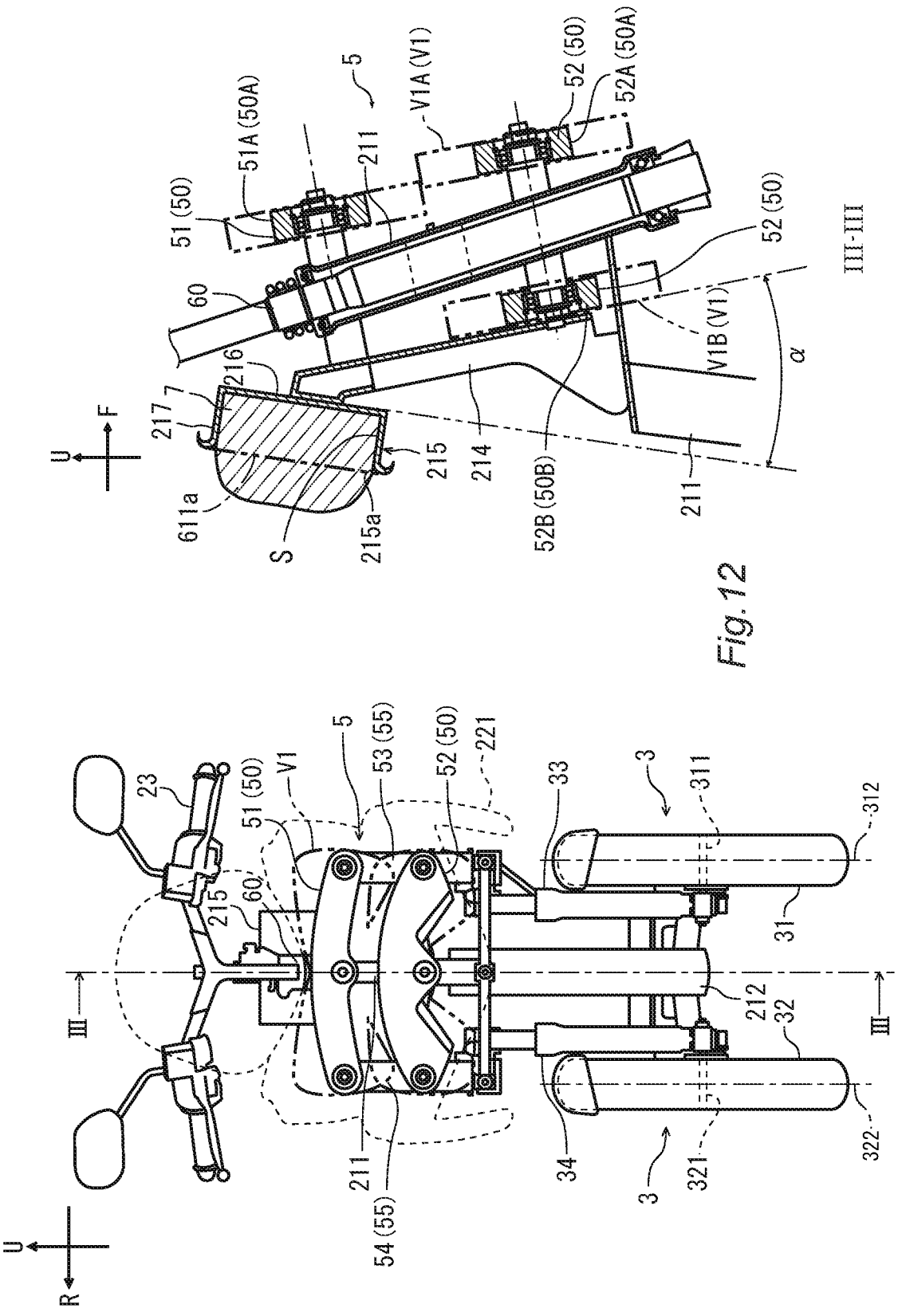
FIG. 12 illustrates a configuration of a vehicle front portion when the vehicle is seen from front with the vehicle body cover detached and a cross-sectional view taken along line III-III.

FIG. 12 illustrates an example of arrangement of the air bag housing case 215. FIG. 12 is the same view as those of FIGS. 2 and 3. At least a part of the air bag housing case 215 is located below the highest one of the upper ends of the first penetration part 211a, the second penetration part 211b, and the third penetration part 211c supporting the linkage mechanism 5 on the head pipe 211, in the top-bottom direction.

The housing space S of the air bag housing case 215 houses the air bag device 7. The air bag device 7 includes an air bag 611 (see FIG. 6) and an inflator (not shown) for supplying an inflating gas to the air bag 611. The air bag 611 in a folded state is housed in the housing space S.

Figure 6:
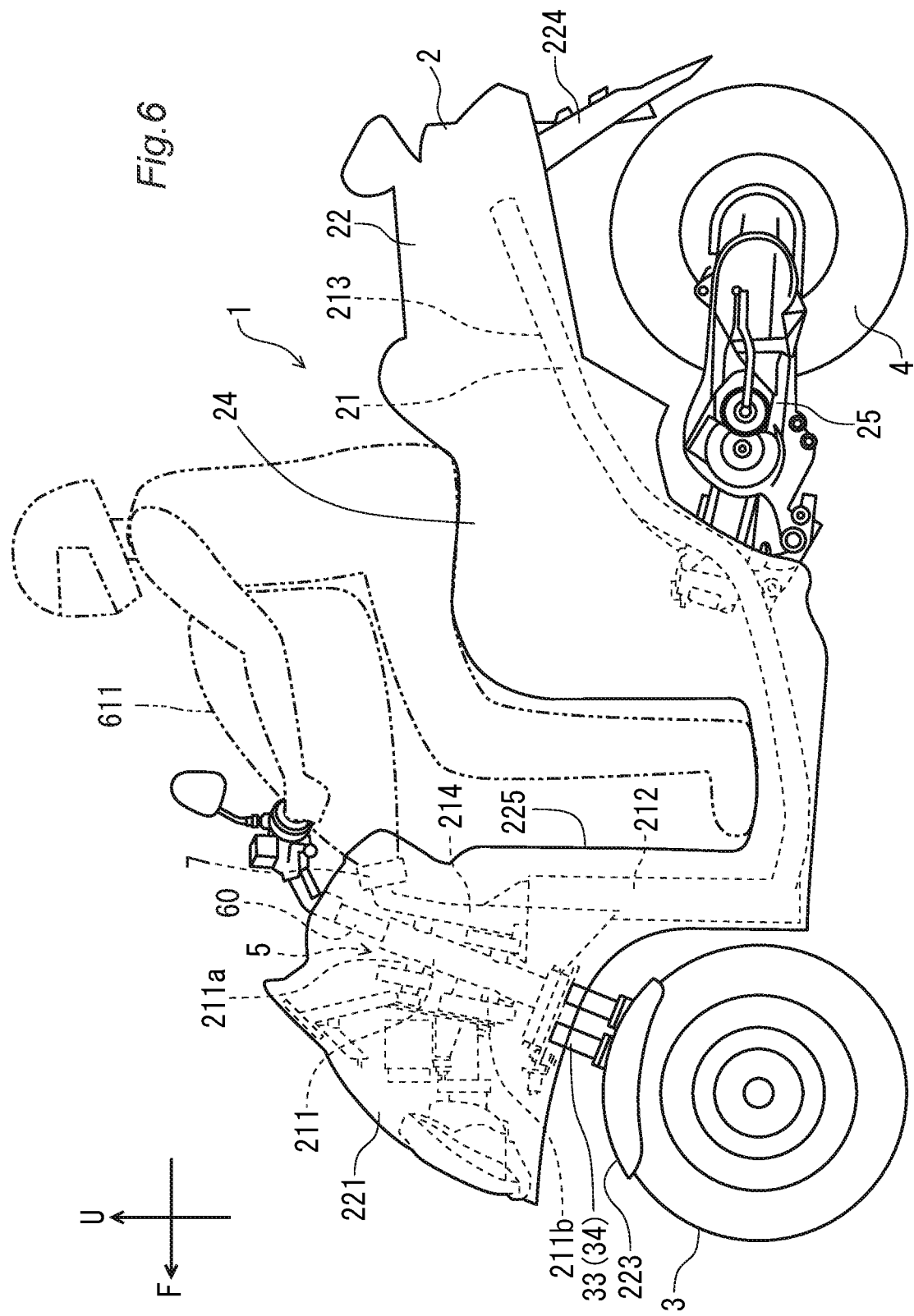
FIG. 6 is a view corresponding to FIG. 1 and illustrates a state where an air bag is deployed.

When the inflator is actuated, the air bag 611 is deployed outward from the opening 215a of the air bag housing case 215 while expanding with the inflating gas supplied from the inflator (see FIG. 6). That is, the air bag 611 is deployed from the opening 215a of the air bag housing case 215. As illustrated in FIG. 3, in this embodiment, since the plane surrounded by an opening end of the opening 215a of the air bag housing case 215 is parallel to the bottom surface 216, the plane surrounded by the opening end corresponds to a deployed plane 611a of the air bag 611. The deployed plane 611a is a plane orthogonal to a deployment direction of the air bag 611.

As illustrated in FIGS. 1 and 3, the air bag housing case 215 is disposed such that a line perpendicular to the deployed plane 611a of the air bag 611 extends rearward and upward in the vehicle. As illustrated in FIGS. 1 and 4, the air bag housing case 215 is disposed such that the opening 215a of the air bag 611 is disposed ahead of the rear end of the handlebar 23 in the front-rear direction.

As illustrated in FIG. 1, the air bag housing case 215 is disposed such that the opening 215a is located below the handlebar 23 in the top-bottom direction. As illustrated in FIG. 2, the air bag housing case 215 is disposed at the right of the left end of the plurality of cross members 50 of the linkage mechanism 5 and at the left of the right end of the plurality of cross members 50 in the left-right direction. In addition, when seen from the front of the vehicle, the air bag housing case 215 is disposed to overlap a center portion in the left-right direction of the plurality of cross members 50. In this embodiment, the air bag housing case 215 is disposed such that a center in the left-right direction of the air bag housing case 215 overlaps a center portion in the left-right direction of the plurality of cross members 50 when seen from the front of the vehicle.

(Lean of Vehicle Body)

Figure 5:
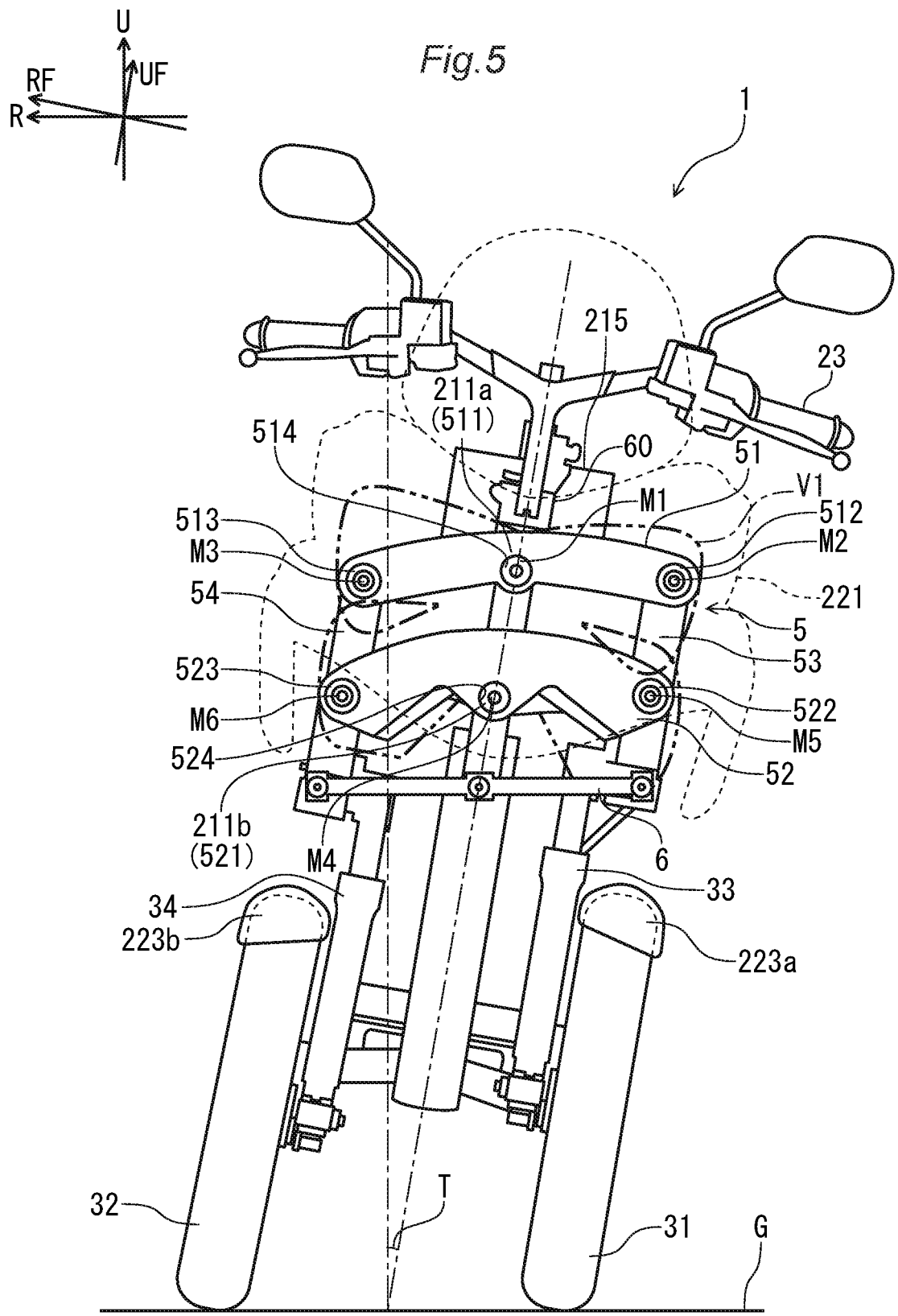
FIG. 5 is a view corresponding to FIG. 2 and illustrates a state where the vehicle leans.

Next, a case where the vehicle 1 having a configuration as described above leans will be described. FIG. 5 is a front view illustrating a case where the vehicle 1 tilts leftward or rightward at an angle T with respect to the vertical direction from the state illustrated in FIG. 2. When the linkage mechanism 5 is actuated, the vehicle 1 thereby leans with respect to the vertical direction.

In this description, right RF of the body frame 21 refers to right in a direction orthogonal to the axial direction of the head pipe 211 in a front view of the vehicle 1. Upward UF of the body frame 21 refers to upward in the axial direction of the head pipe 211 in a state where the vehicle 1 leans in the front view of the vehicle 1.

In the state where the vehicle 1 is in the upright position as illustrated in FIG. 2, the upward direction of the body frame 21 coincides with the upward direction of the head pipe 211 in the axial direction in the front view of the vehicle 1. In the state where the vehicle 1 is in the upright position, right RF of the body frame 21 coincides with right R in the horizontal direction.

On the other hand, as illustrated in FIG. 5, in a state where the vehicle 1 tilts with respect to a road surface G, right RF of the body frame 21 does not coincide with right R in the horizontal direction, and upward UF of the body frame 21 does not coincide with upward U in the vertical direction.

In the state illustrated in FIG. 5, the upper cross member 51 and the lower cross members 52 move in parallel leftward or rightward with the extension directions thereof being kept in parallel with the road surface G. The upper cross member 51 and the lower cross members 52 rotate with respect to the left side member 53 using the upper left axis M2 of the upper left bearing 512 and the lower left axis M5 of the lower left bearing 522, respectively, as rotation centers. The upper cross member 51 and the lower cross members 52 also rotate with respect to the right side member 54 using the upper right axis M3 of the upper right bearing 513 and the lower right axis M6 of the lower right bearing 523, respectively, as rotation centers.

When the vehicle 1 is seen from the front in the upper intermediate axis M1, the linkage mechanism 5 deforms in such a manner that the upper cross member 51, the lower cross members 52, the left side member 53, and the right side member 54 form a rectangle while the vehicle 1 is in the upright position, and form a parallelogram while the vehicle 1 leans.

In the example illustrated in FIG. 5, the linkage mechanism 5 is actuated in such a manner that the left end of the upper cross member 51 moves to the left of the left end of the lower cross members 52 in the left-right direction of the body frame 21. This actuation of the linkage mechanism 5 causes the left shock absorber 33 and the right shock absorber 34 to lean in the vertical direction. In this manner, when the vehicle 1 leans leftward relative to the vertical direction, the vehicle 1 reaches a lean position illustrated in FIG. 5 from the upright position illustrated in FIG. 2.

The vehicle 1 can be turned by leaning the vehicle 1 leftward or rightward during traveling. As described above, orientations of the left front wheel 31 and the right front wheel 32 can be changed by operating the handlebar 23.

A region where the upper cross member 51 and the lower cross members 52 move relative to the body frame 21 when the vehicle 1 leans from the upright position leftward or rightward to maximum is a movable region V1 of the plurality of cross members 50 (indicated by heavy dot-dash lines in FIGS. 2 and 5). As illustrated in FIG. 3, the movable region V1 of the cross members 50 includes a front movable region V1A that is a movable region of the front cross member 50A relative to the body frame 21 and a rear movable region V1B that is a movable region of the rear cross member 50B relative to the body frame 21.

As illustrated in FIG. 3, the air bag housing case 215 is supported on the support frame 214 such that the opening 215a is open to the rear of the vehicle and upward. When seen from a side of the vehicle, the bottom surface 216 of the air bag housing case 215 is disposed along the rear surface of the movable region V1 (V1B). The expression that the bottom surface 216 is disposed along the rear surface of the movable region V1 (V1B) includes not only a case where the bottom surface 216 and the rear surface are parallel but also a case where an angle α formed by the bottom surface 216 and the rear surface is 45 degrees or less.

The rear surface is a surface including a rear portion of the movable region V1 of the linkage mechanism 5. That is, the rear surface is a surface including a trajectory drawn by the rear lower cross member 52B of the linkage mechanism 5 when the rear lower cross member 52B moves relative to the body frame 21. In this embodiment, the rear lower cross member 52B has a flat-plate shape. Accordingly, the rear surface includes a rear surface of the rear lower cross member 52B.

At least a part of the air bag housing case 215 is disposed below the upper end of the movable region V1 of the linkage mechanism 5. Specifically, as illustrated in FIG. 3, a part of the air bag housing case 215 is located below the upper end of the front movable region V1A of the front cross member 50A of the linkage mechanism 5 in the top-bottom direction.

As described above, when seen from a side of the vehicle, the air bag housing case 215 is disposed in such a manner that the bottom surface 216 of the air bag housing case 215 disposed along the surface (rear surface) including a vehicle rear portion of the movable region V1 of the linkage mechanism 5. Accordingly, the air bag housing case 215 can be disposed at a position closer to the linkage mechanism 5. As a result, projection of the air bag housing case 215 toward a rider can be prevented, and an increase in size of a front portion of the vehicle 1 can also be prevented.

At least a part of the air bag housing case 215 is located below the highest one of the upper ends (an upper end of a linkage support part) of the first penetration part 211a, the second penetration part 211b, and the third penetration part 211c supporting the linkage mechanism 5 on the head pipe 211, in the top-bottom direction. Thus, the air bag housing case 215 can be disposed at a position closer to a rider in the top-bottom direction. As a result, the air bag 611 can be deployed at a position closer to the rider.

In addition, at least a part of the air bag housing case 215 is located below the upper end of the movable region V1 of the linkage mechanism 5 in the top-bottom direction. Thus, in the top-bottom direction, the air bag housing case 215 can be disposed at a position much closer to the rider. Accordingly, the air bag 611 can be deployed at a position much closer to the rider in the top-bottom direction.

The opening 215a of the air bag housing case 215 is disposed below the handlebar 23 in the top-bottom direction. Thus, the air bag housing case 215 can be disposed in a vehicle front portion. Accordingly, the air bag 611 can be deployed to the rider from the front.

The air bag housing case 215 is disposed at the right of the left end of the plurality of cross members 50 of the linkage mechanism 5 and at the left of the right end of the plurality of cross members 50, in the left-right direction. Thus, in the vehicle 1, the air bag housing case 215 can be disposed close to the center in the left-right direction. Accordingly, the air bag 611 can be deployed between the rider and the vehicle body 2.

The air bag housing case 215 is disposed to overlap a center portion in the left-right direction of the plurality of cross members 50 when seen from the front of the vehicle. Thus, in the vehicle 1, the air bag housing case 215 can be disposed closer to the center in the left-right direction. Accordingly, the air bag 611 can be more securely deployed between the rider and the vehicle body 2.

Figure 7:
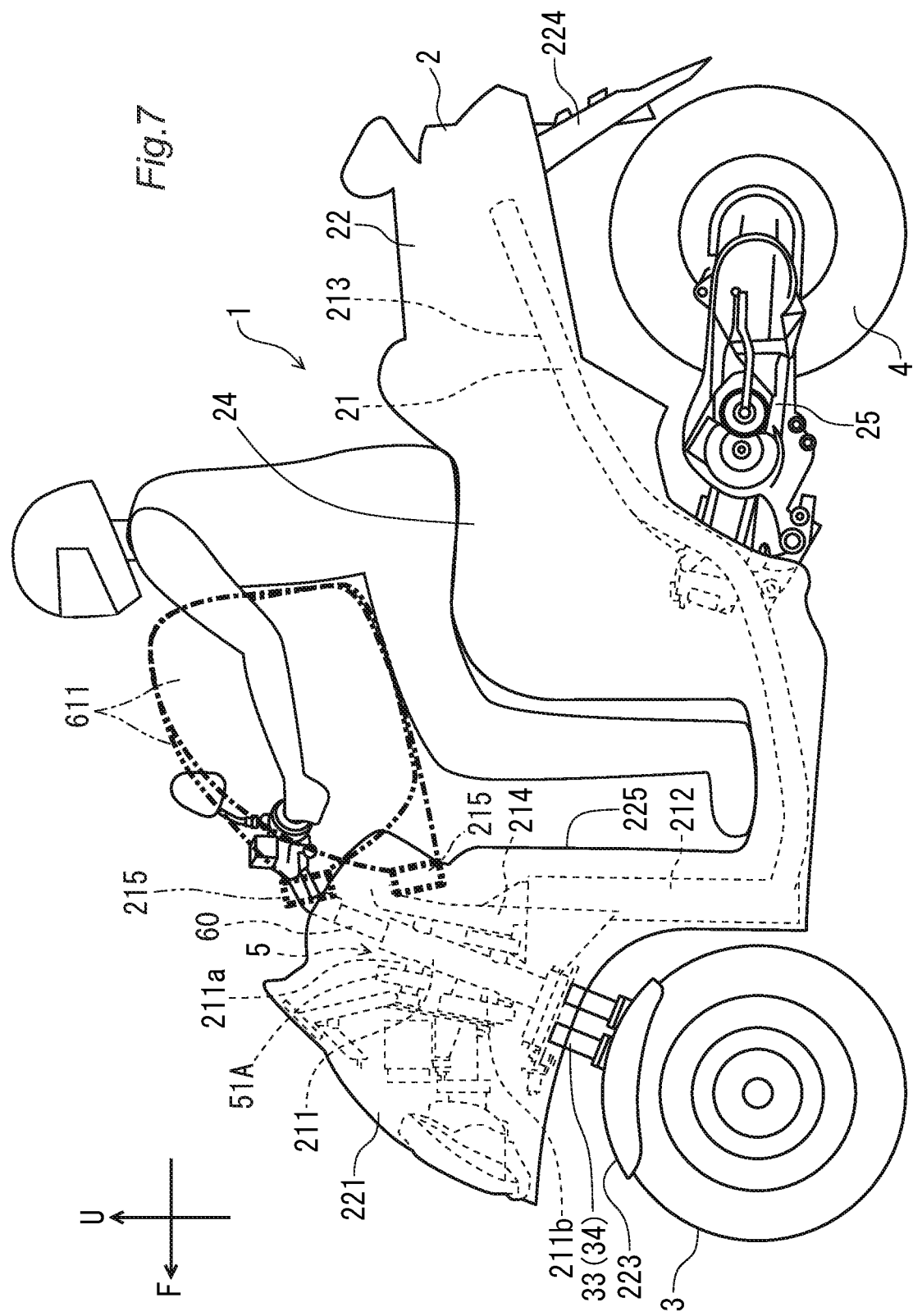
FIG. 7 is a view illustrating examples of an upper limit position and a lower limit position of an air bag housing case in a top-bottom direction.

As illustrated in FIG. 7, the air bag housing case 215 is preferably disposed below the handlebar 23 in the top-bottom direction and is preferably disposed to be at least partially overlap the front upper cross member 51A when seen from the front of the vehicle. Accordingly, in deploying the air bag 611, the air bag 611 can be deployed to push thighs of the rider seated on the seat 24 from above. In FIG. 7, the lower limit position of the air bag housing case 215 in a case where the air bag 611 is deployed to push the thighs of the rider seated on the seat 24 from above is represented by dot-dash lines, and the upper limit position of the air bag housing case 215 in this case is represented by dot-dot-dash lines. In FIG. 7, the air bag 611 represented by the dot-dash lines represents a case where the air bag 611 is deployed with the air bag housing case 215 located at the position indicated by the dot-dash lines (lower limit position), and the air bag 611 represented by the dot-dot-dash lines represents a case where the air bag 611 is deployed with the air bag housing case 215 located at the position indicated by the dot-dot-dash lines (upper limit position).

In this embodiment, the linkage mechanism 5 includes the front upper cross member 51A, the front lower cross member 52A, and the rear lower cross member 52B. As illustrated in FIG. 3, in the front-rear direction, no cross members are provided behind the front upper cross member 51A. Thus, in the front-rear direction, the air bag housing case 215 is disposed in a space behind the front upper cross member 51A so that the air bag housing case 215 can be made compact relative to the linkage mechanism 5. Accordingly, the front portion of the vehicle 1 can also be made compact.

In this embodiment, the air bag housing case 215 is disposed behind the linkage mechanism 5. The linkage mechanism 5 includes the plurality of cross members 50 and the plurality of side members 55, and has a relatively high rigidity in the body frame 21. Thus, even at a collision of the front portion of the vehicle 1, the linkage mechanism 5 can reduce damage on the air bag housing case 215.

Second Embodiment (Overall Configuration)

Next, a configuration of a vehicle 1000 according to a second embodiment will be described with reference to FIGS. 8 through 11. The vehicle 1000 according to the second embodiment has a configuration different from that of the vehicle 1 according to the first embodiment in including a first steering shaft 1060A and a second steering shaft 1060B. In the following description, components of the second embodiment similar to those of the first embodiment are denoted by the same reference characters and will not be described again, and only components different from those of the first embodiment will be described.

Figure 8:
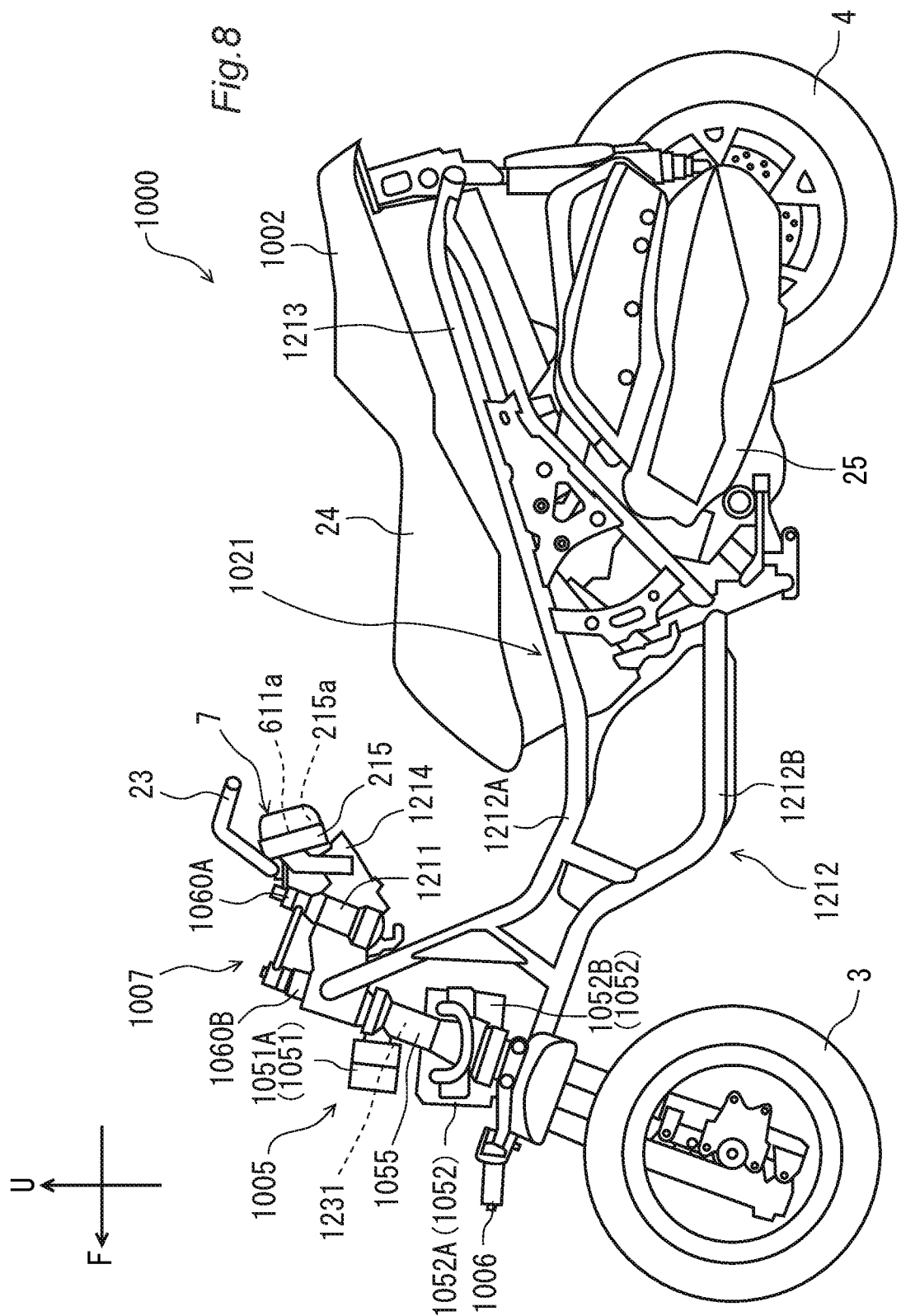
FIG. 8 is a side view illustrating a schematic configuration of a vehicle according to a second embodiment in a state where a vehicle body cover, for example, is detached.

FIG. 8 is a side view illustrating the entire vehicle 1000 seen from the left with a vehicle body cover detached. As illustrated in FIG. 8, the vehicle 1000 includes a vehicle body 1002, a pair of left and right front wheels 3, a rear wheel 4, a linkage mechanism 1005, an air bag device 7, and a connecting member 1007. The vehicle 1000 according to the second embodiment is also a tricycle having the pair of left and right front wheels 3.

The vehicle body 1002 includes a body frame 1021, an unillustrated vehicle body cover, a seat 24, and a power unit 25. The body frame 1021 extends in a front-rear direction of the vehicle 1000. The body frame 1021 includes a head pipe 1211 extending in a top-bottom direction, a support member 1231 disposed ahead of the head pipe 1211, a front frame 1212 extending from the support member 1231 rearward in the vehicle, and a rear frame 1213 extending from a vehicle rear end of the front frame 1212 rearward in the vehicle.

The head pipe 1211 extends in a top-bottom direction. The head pipe 1211 rotatably supports the first steering shaft 1060A (steering shaft) inserted inside the head pipe 1211. In the front-rear direction, a support frame 1214 extending rearward in the vehicle is disposed behind the head pipe 1211. An air bag housing case 215 housing an air bag device 7 is attached to a rear end of the support frame 1214.

Although not specifically shown, a rear portion of the air bag device 7 in the front-rear direction is covered with the vehicle body cover, in a manner similar to the first embodiment.

The support member 1231 is disposed ahead of the head pipe 1211 in the front-rear direction. The support member 1231 is a cylindrical tubular member. The support member 1231 rotatably supports the second steering shaft 1060B inserted inside the support member 1231, and supports the linkage mechanism 1005 on the outer surface of the support member 1231. The head pipe 1211 and the support member 1231 are connected to each other.

A handlebar 23 extending in a vehicle width direction is attached to the upper end of the first steering shaft 1060A.

The front frame 1212 includes an upper front frame 1212A and a lower front frame 1212B. The upper front frame 1212A and the lower front frame 1212B extend in the front-rear direction. The front end of the upper front frame 1212A is connected to the support member 1231 in the front-rear direction. The lower front frame 1212B is disposed below the upper front frame 1212A in the top-bottom direction. The front end of the lower front frame 1212B in the front-rear direction is connected to the lower end of the support member 1231.

The rear frame 1213 supports a seat 24 and a tail lamp (not shown).

Figure 9:
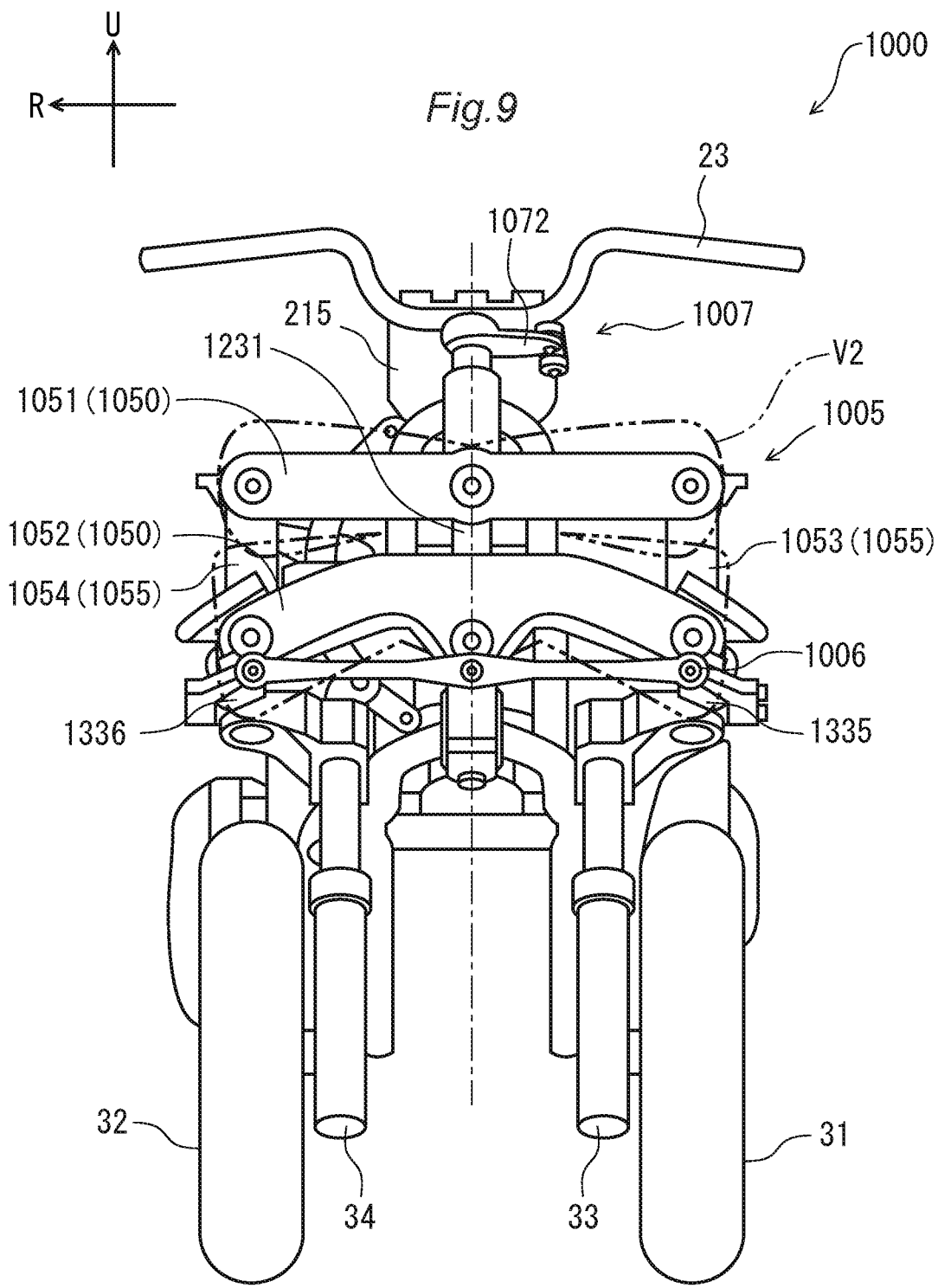
FIG. 9 is a front view illustrating a configuration of a vehicle front portion when the vehicle according to the second embodiment is seen with the vehicle body cover, for example, detached.

FIG. 9 is a front view illustrating a front portion of the vehicle 1000 seen from the front with the vehicle body cover detached. As illustrated in FIG. 9, in the vehicle 1000 according to this embodiment, the pair of left and right front wheels 3 also includes a left front wheel 31 and a right front wheel 32, in a manner similar to the vehicle 1 according to the first embodiment.

The linkage mechanism 1005 is connected to the left front wheel 31 through the left shock absorber 33 and to the right front wheel 32 through the right shock absorber 34. The linkage mechanism 1005 is rotatably attached to the support member 1231. The linkage mechanism 1005 includes a plurality of cross members 1050 and a plurality of side members 1055.

As illustrated in FIGS. 8 and 9, the plurality of cross members 1050 include an upper cross member 1051 and a plurality of lower cross members 1052. As illustrated in FIG. 8, the upper cross member 1051 includes a front upper cross member 1051A disposed ahead of the support member 1231 in the front-rear direction. The front upper cross member 1051A is a flat plate-shaped member. The plurality of lower cross members 1052 include a front lower cross member 1052A disposed ahead of the support member 1231 and a rear lower cross member 1052B disposed behind the support member 1231 in the front-rear direction. The front lower cross member 1052A and the rear lower cross member 1052B are flat plate-shaped members, respectively.

As illustrated in FIG. 9, the plurality of side members 1055 include a left side member 1053 and a right side member 1054.

Each of the upper cross member 1051 and the plurality of lower cross members 1052 is rotatably supported on the support member 1231 at a center portion in the left-right direction thereof. The linkage mechanism 1005 has a configuration similar to that of the linkage mechanism 5 of the first embodiment except that the upper cross member 1051 and the plurality of lower cross members 1052 are rotatably supported on the support member 1231. Thus, the linkage mechanism 1005 operates in a manner similar to the linkage mechanism 5 of the first embodiment. In this embodiment, a detailed configuration and a detailed operation of the linkage mechanism 1005 will not be described.

In FIGS. 8 and 9, reference numeral 1006 denotes a tie rod having a function similar to the tie rod 6 of the first embodiment. The tie rod 1006 is connected to a lower portion of the second steering shaft 1060B. In a manner similar to the configuration of the first embodiment, the tie rod 1006 is connected to the left shock absorber 33 rotatably supporting the left front wheel 31 through the left bracket 1335. In a manner similar to the first embodiment, the tie rod 1006 is connected to the right shock absorber 34 rotatably supporting the right front wheel 32 through the right bracket 1336. Accordingly, when the second steering shaft 1060B rotates, the tie rod 1006 moves in the left direction or in the right direction.

The second steering shaft 1060B is rotatably supported on the support member 1231. The second steering shaft 1060B is connected to the first steering shaft 1060A rotatably supported on the head pipe through the connecting member 1007.

Figure 10:
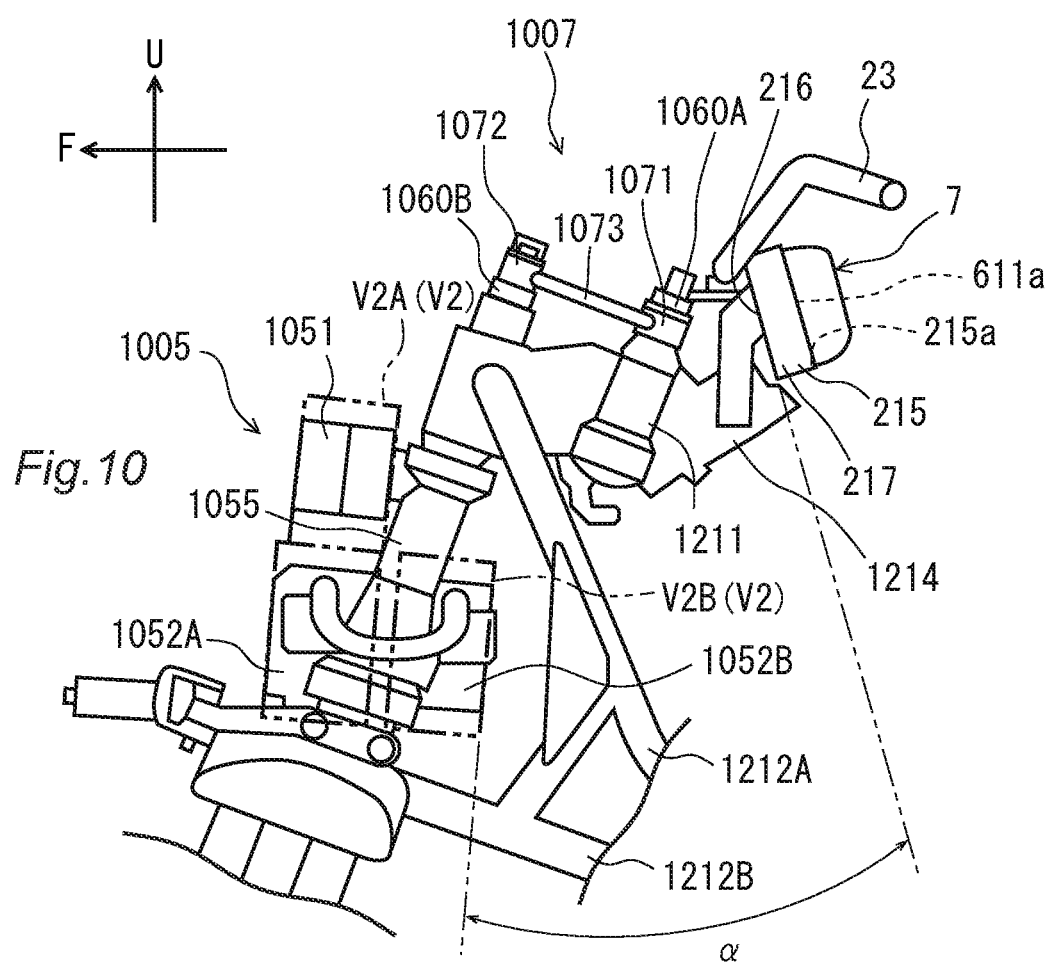
FIG. 10 is an enlarged side view illustrating a front portion of the vehicle according to the second embodiment from side.
Figure 11:
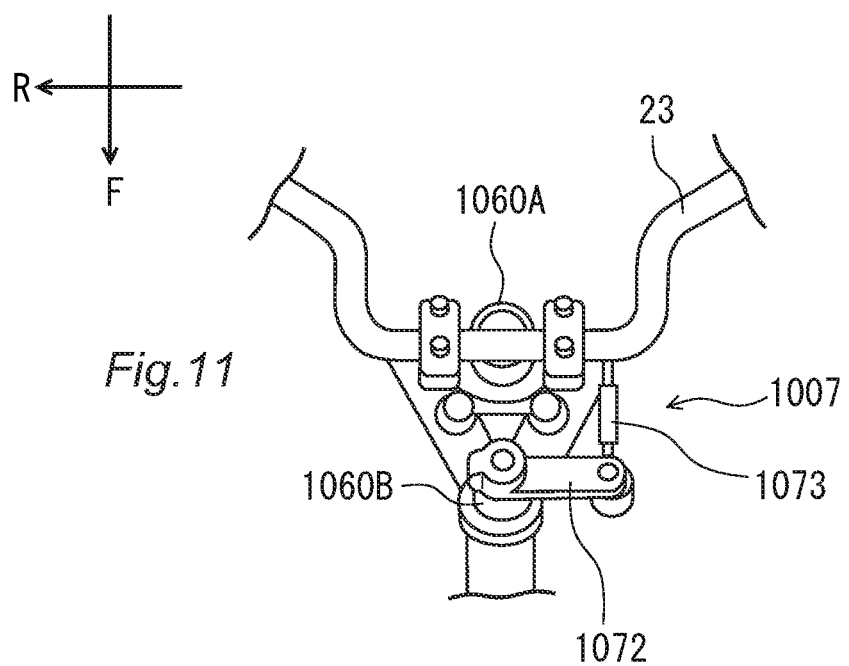
FIG. 11 is an enlarged top view illustrating a connecting structure between a first steering shaft and a second steering shaft.

FIG. 10 is an enlarged side view of a front portion of the vehicle 1000 when seen from the front. FIG. 11 is an enlarged top view illustrating a connecting structure between the first steering shaft 1060A and the second steering shaft 1060B.

As illustrated in FIGS. 10 and 11, the connecting member 1007 includes a first fixing part 1071 connected to the first steering shaft 1060A, a second fixing part 1072 connected to the second steering shaft 1060B, and a connecting shaft 1073 connecting the first fixing part 1071 and the second fixing part 1072.

The first fixing part 1071 is disposed below the handlebar 23 in the top-bottom direction. The first fixing part 1071 is connected to an upper portion of the first steering shaft 1060A. The first fixing part 1071 extends from the first steering shaft 1060A leftward in the vehicle.

The second fixing part 1072 is connected to the upper end of the second steering shaft 1060B. The second fixing part 1072 extends from the second steering shaft 1060B leftward in the vehicle.

The connecting shaft 1073 is disposed below the handlebar 23 in the top-bottom direction. One end of the connecting shaft 1073 is connected to the left end of the first fixing part 1071 so that the connecting shaft 1073 is rotatable about an axis extending in the top-bottom direction. The other end of the connecting shaft 1073 is connected to the left end of the second fixing part 1072 so that the connecting shaft 1073 is rotatable about an axis extending in the top-bottom direction.

Accordingly, in a case where the first steering shaft 1060A is rotated clockwise by operating the handlebar 23, the first fixing part 1071 also rotates clockwise together with the first steering shaft 1060A. In accordance with the rotation of the first fixing part 1071, the connecting shaft 1073 is displaced forward in the vehicle. With the displacement of the connecting shaft 1073, the second fixing part 1072 and the second steering shaft 1060B are rotated clockwise.

On the other hand, in a case where the first steering shaft 1060A is rotated counterclockwise by operating the handlebar 23, the first fixing part 1071 also rotates counterclockwise together with the first steering shaft 1060A. In accordance with the rotation of the first fixing part 1071, the connecting shaft 1073 is displaced rearward in the vehicle. With the displacement of the connecting shaft 1073, the second fixing part 1072 and the second steering shaft 1060B are rotated counterclockwise.

In the manner described above, the first steering shaft 1060A and the second steering shaft 1060B are connected to each other by the connecting member 1007 so that rotation of the first steering shaft 1060A can be transferred to the second steering shaft 1060B. The rotation of the second steering shaft 1060B causes the tie rod 1006 to rotate. Accordingly, the left front wheel 31 connected to the tie rod 1006 through the left bracket 1335 and the left shock absorber 33 and the right front wheel 32 connected to the tie rod 1006 through the right bracket 1336 and the left shock absorber 34 can be rotated.

The vehicle 1000 is leaned with respect to the vertical direction in a manner similar to the first embodiment so that the linkage mechanism 1005 operates in a manner similar to the linkage mechanism 5. That is, the upper cross member 1051 and the lower cross members 1052 move in parallel in the left direction or in the right direction with the extension direction thereof being kept in parallel with the road surface.

The upper cross member 1051 and the lower cross members 1052 rotate with respect to the left side member 1053, respectively. The upper cross member 1051 and the lower cross members 1052 also rotate with respect to the right side member 1054, respectively.

Accordingly, when the vehicle 1000 is seen from the front, the linkage mechanism 1005 is deformed in such a manner that the upper cross member 1051, the lower cross members 1052, the left side member 1053, and the right side member 1054 form a rectangle while the vehicle 1000 is in the upright position, and form a parallelogram while the vehicle 1000 leans.

As described above, in the linkage mechanism 1005 that operates in a manner similar to the linkage mechanism 5 of the first embodiment, a movable region V2 of the linkage mechanism 1005 is a region including movable regions of the plurality of cross members 1050 and the plurality of side members 1055 in a manner similar to the linkage mechanism 1005 of the first embodiment. The movable region V2 of the linkage mechanism 1005 is illustrated in FIGS. 9 and 10. The lower end of the movable region V2 is the lowest position of the linkage mechanism 1005 while the linkage mechanism 1005 operates, that is, is the lower end of the movable region of the lower cross members 1052 in this embodiment. The upper end of the movable region V2 is the uppermost position of the linkage mechanism 1005 while the linkage mechanism 1005 operates, that is, the upper end of the movable region of the upper cross member 1051 in this embodiment.

The front end of the range of the movable region V2 in the front-rear direction is restricted by the movable regions of the front upper cross member 1051A and the front lower cross member 1052A, and the rear end of the range of the movable region V2 in the front-rear direction is restricted by the movable region of the rear lower cross member 1052B. That is, the front end of the movable region is restricted by each of the front surfaces of the front upper cross member 1051A and the front lower cross member 1052A. The rear end of the movable region is restricted by the rear surface of the rear lower cross member 1052B. The range of the movable region when seen from the front of the vehicle has an M shape in which a lower center portion is recessed when seen from the front, as indicated by heavy dot-dash lines in FIG. 9.

As illustrated in FIG. 10, the movable region V2 of the linkage mechanism 1005 includes a movable region V2A of the upper cross member 1051 and the front lower cross member 1052A and a movable region V2B of the rear lower cross member 1052B.

(Air Bag Device)

In the vehicle 1000 according to this embodiment, the air bag device 7 is also located behind the linkage mechanism 1005 in the front-rear direction in a manner similar to the vehicle 1 according to the first embodiment. The air bag device 7 is located below the upper end of the handlebar 23 and above the lower end of the movable region V2 of the linkage mechanism 1005 in the top-bottom direction (see FIG. 8). When a collision of the vehicle 1000 is detected by an unillustrated sensor or the like, the air bag device 7 is deployed from the front to a rider seated on the seat 24.

An air bag housing case 215 is connected to the support frame 1214 connected to the head pipe 1214. The air bag housing case 215 has a box shape having an opening 215a. A plane surrounded by an opening end of the opening 215a corresponds to a deployed plane 611a of the air bag 611. The deployed plane 611a is a plane orthogonal to a deployment direction of the air bag 611. A configuration of the air bag housing case 215 is similar to that in the first embodiment, and thus, detailed description of the configuration of the air bag housing case 215 will not be repeated.

The air bag housing case 215 is located above the linkage mechanism 1005 in the top-bottom direction. As illustrated in FIGS. 8 and 10, the air bag housing case 215 is disposed such that the opening 215a of the air bag housing case 215 is disposed ahead of the rear end of the handlebar 23 in the front-rear direction in the vehicle. The air bag housing case 215 is disposed such that the opening 215a of the air bag housing case 215 is located below the handlebar 23 in the top-bottom direction.

As illustrated in FIG. 9, the air bag housing case 215 is disposed at the right of the left end of the plurality of cross members 1050 of the linkage mechanism 1005 and at the left of the right end of the plurality of cross members 1050 in the left-right direction. In addition, when seen from the front of the vehicle, the air bag housing case 215 is disposed to overlap a center portion in the left-right direction of the plurality of cross members 1050. In this embodiment, the air bag housing case 215 is disposed such that a center in the left-right direction of the air bag housing case 215 overlaps a center portion in the left-right direction of the plurality of cross members 1050 when seen from the front of the vehicle.

As illustrated in FIG. 10, the air bag housing case 215 is supported on the support frame 1214 such that the opening 215a is open to the rear of the vehicle and upward. When seen from a side of the vehicle, the bottom surface 216 of the air bag housing case 215 is disposed along the rear surface of the movable region V2 (V2B). The expression that the bottom surface 216 is disposed along the rear surface of the movable region V2 (V2B) includes not only a case where the bottom surface 216 and the rear surface are parallel but also a case where an angle α formed by the bottom surface 216 and the rear surface is 45 degrees or less.

The rear surface is a surface including a rear portion of the movable region V2 of the linkage mechanism 1005 in the front-rear direction. That is, the rear surface is a surface including a trajectory drawn by the rear lower cross member 1052B of the linkage mechanism 1005 when the rear lower cross member 1052B moves relative to the body frame 1021. In this embodiment, the rear lower cross member 1052B has a flat-plate shape. Accordingly, the rear surface includes a rear surface of the rear lower cross member 1052B in the front-rear direction.

The air bag housing case 215 is located above the movable region V2 of the linkage mechanism 1055 in the top-bottom direction.

As described above, the air bag housing case 215 is disposed such that the bottom surface 216 extends along the rear surface of the movable region V2 (V2B). Accordingly, the air bag housing case 215 can be disposed closer to the linkage mechanism 1005. As a result, projection of the air bag housing case 215 toward a rider can be prevented, and an increase in size of a front portion of the vehicle 1000 can also be prevented.

The opening 215a of the air bag housing case 215 is disposed below the handlebar 23 in the top-bottom direction. Thus, the air bag housing case 215 can be disposed in a vehicle front portion. Accordingly, the air bag 611 can be deployed to the rider from the front of the vehicle.

The air bag housing case 215 is disposed at the right of the left end of the plurality of cross members 1050 of the linkage mechanism 1005 and at the left of the right end of the plurality of cross members 1050 when seen from the front of the vehicle. Thus, in the vehicle 1000, the air bag housing case 215 can be disposed close to the center in the left-right direction. Accordingly, the air bag 611 can be deployed between the rider and the vehicle body 1002.

The air bag housing case 215 is disposed to overlap a center portion in the left-right direction of the plurality of cross members 1050 when seen from the front of the vehicle. Thus, in the vehicle 1000, the air bag housing case 215 can be disposed closer to the center in the left-right direction. Accordingly, the air bag 611 can be more securely deployed between the rider and the vehicle body 1002.

Other Embodiments

The embodiments of the present teaching has been described above, but the embodiments are merely examples for carrying out the present teaching. Thus, the present teaching is not limited to the embodiments described above, and the embodiments may be modified as necessary within a range not departing from the gist of the present teaching.

In the first embodiment, the air bag housing case 215 is disposed at least partially below the upper end of the movable region V1 of the linkage mechanism 5 in the top-bottom direction. Alternatively, as illustrated in FIG. 10 for the second embodiment, for example, the air bag housing case 215 may be disposed above the movable region V2 of the linkage mechanism 1005 in the top-bottom direction.

In the first embodiment, the air bag housing case 215 is disposed at least partially below the highest one of the upper ends of the first penetration part 211a, the second penetration part 211b, and the third penetration part 211c supporting the linkage mechanism 5 on the head pipe 211, in the top-bottom direction. Alternatively, the air bag housing case 215 may be disposed above the highest one of the upper ends of the first penetration part 211a, the second penetration part 211b, and the third penetration part 211c, in the top-bottom direction.

In the embodiments, the opening 215a of the air bag housing case 215 is disposed below the handlebar 23. Alternatively, the opening 215a is not limited to a specific position as long as the air bag housing case 215 is located below the upper end of the handlebar 23 and at least a part of the air bag housing case 215 is located above the lower end of the movable region V1 of the linkage mechanism 5.

In the embodiments, the air bag housing case 215 is disposed at the right of the left end of the plurality of cross members 50, 1050 of the linkage mechanism 5, 1005 and at the left of the right end of the plurality of cross members 50, 1050 of the linkage mechanism 5, 1005, in the left-right direction. Alternatively, the air bag housing case 215 may be disposed at the left of the left end of the plurality of cross members 50, 1050 of the linkage mechanism 5, 1005 and at the right of the right end of the plurality of cross members 50, 1050 of the linkage mechanism 5, 1005, in the left-right direction.

In the embodiments, the air bag housing case 215 is disposed to overlap a center portion in the left-right direction of the plurality of cross members 50, 1050 when seen from the front of the vehicle. Alternatively, the air bag housing case 215 may be disposed not to overlap the center portion in the left-right direction of the plurality of cross members 50, 1050 when seen from the front of the vehicle.

In the embodiments, the air bag housing case 215 is disposed such that the line perpendicular to the deployed plane 611a of the air bag 611 extends rearward and upward in the vehicle. Alternatively, the air bag housing case 215 may be disposed such that the line perpendicular to the deployed plane 611a extends in a direction other than rearward and upward as long as the air bag 611 can be deployed to a rider.

In the embodiments, the front upper cross member 51A, 1051A is a flat plate-shaped member, and the front lower cross member 52A, 1052A and the rear lower cross member 52B, 1052B are flat plate-shaped members. Alternatively, the front upper cross member 51A, 1051A, the front lower cross member 52A, 1052A, and the rear lower cross member 52B, 1052B may be members of shapes except the flat plate-shape.

In the embodiments, the linkage mechanism 5, 1005 includes the front upper cross member 51A, 1051A, the front lower cross member 52A, 1052A, and the rear lower cross member 52B, 1052B. That is, in the linkage mechanism 5, 1005, no cross members are provided behind the front upper cross member 51A, 1051A in the front-rear direction. Alternatively, a rear upper cross member may be provided behind the front upper cross member 51A, 1051A.

What is claimed is:
1. A vehicle including an air bag, the vehicle comprising:
a handlebar connected to a steering shaft;
a body frame supporting the steering shaft so that the steering shaft is rotatable;
a left front wheel and a right front wheel respectively disposed at a left and a right of the vehicle when seen from a front of the vehicle, the left front wheel and the right front wheel being steerable;
a left shock absorber that supports the left front wheel on a lower portion of the left shock absorber and buffers an impact on the left front wheel in a top-bottom direction of the body frame;
a right shock absorber that supports the right front wheel on a lower portion of the right shock absorber and buffers an impact on the right front wheel in the top-bottom direction of the body frame;
a linkage mechanism including
a right side member that supports an upper portion of the right shock absorber so that the upper portion of the right shock absorber is rotatable about a right steering axis extending in the top-bottom direction of the body frame,
a left side member that supports an upper portion of the left shock absorber so that the upper portion of the left shock absorber is rotatable about a left steering axis parallel to the right steering axis, and
a plurality of cross members having right end portions that support the right side member so that the right side member is rotatable about a right axis extending in a front-rear direction of the body frame, left end portions that support the left side member so that the left side member is rotatable about a left axis parallel to the right axis, and intermediate portions supported on the body frame so that the intermediate portions are rotatable about an intermediate axis parallel to the right axis and the left axis; and
an air bag housing part having a bottom surface, side surfaces, and a housing space having an opening, the housing space being defined by the bottom surface and the side surfaces and being surrounded by the side surfaces, the housing space housing the air bag in an undeployed state, wherein
the air bag housing part is located behind the linkage mechanism in the front-rear direction and below an upper end of the handlebar in the top-bottom direction,
at least a part of the air bag housing part is located above a lower end of a movable region of the right side member, the left side member, and the plurality of cross members of the linkage mechanism, and the bottom surface of the air bag housing part is disposed along a surface including a rear portion of the movable region when seen from a side of the vehicle.

2. The vehicle according to claim 1, wherein
the body frame includes a linkage support part supporting the linkage mechanism, and
at least a part of the air bag housing part is located below an upper end of the linkage support part in the top-bottom direction.

3. The vehicle according to claim 1, wherein
at least a part of the air bag housing part is disposed below an upper end of the movable region in the top-bottom direction.

4. The vehicle according to claim 1, wherein
the opening of the air bag housing part is disposed below the handlebar in the top-bottom direction.

5. The vehicle according to claim 1, wherein
the air bag housing part is disposed at a right of a left end of the cross members and at a left of a right end of the cross members in a left-right direction.

6. The vehicle according to claim 1, wherein
the air bag housing part overlaps a center portion of the cross members in a left-right direction when seen from the front of the vehicle.

* * * * *